United States Patent [19]
Morrone

[11] Patent Number: 5,341,924

[45] Date of Patent: * Aug. 30, 1994

[54] MEDIA STORAGE APPARATUS

[76] Inventor: James V. Morrone, P.O. Box 26, Essex Station, Boston, Mass. 02112

[ * ] Notice: The portion of the term of this patent subsequent to Aug. 4, 2009 has been disclaimed.

[21] Appl. No.: 404,164

[22] Filed: Sep. 7, 1989

Related U.S. Application Data

[63] Continuation-in-part of Ser. No. 206,033, Jun. 13, 1988, Pat. No. 5,135,106, which is a continuation-in-part of Ser. No. 756,716, Jul. 18, 1985, Pat. No. 4,714,157, which is a continuation-in-part of Ser. No. 785,154, Oct. 7, 1985, Pat. No. 4,750,611, which is a continuation-in-part of Ser. No. 131,358, Dec. 10, 1987, abandoned.

[51] Int. Cl.$^5$ ............................................. B65D 85/57
[52] U.S. Cl. .................................. 206/232; 206/309; 206/310
[58] Field of Search ............... 206/45.13, 45.15, 45.18, 206/45.31, 45.34, 303, 307–313, 425, 444, 459, 232, 459.5; 40/638

[56] References Cited

U.S. PATENT DOCUMENTS

| | | | |
|---|---|---|---|
| 3,679,047 | 7/1972 | Papirnyik | 206/459 |
| 4,428,480 | 1/1984 | Ackeret | 206/387 |
| 4,535,888 | 8/1985 | Nusselder | 206/311 |
| 4,586,603 | 5/1986 | Long et al. | 206/45.18 |
| 4,598,824 | 7/1986 | Long et al. | 206/45.18 |
| 4,635,797 | 1/1987 | Bankier | 206/312 |
| 4,676,372 | 6/1987 | Rager | 206/425 |
| 4,702,369 | 10/1987 | Philosophe | 206/312 |
| 4,714,157 | 12/1987 | Morrone | 206/309 |
| 4,717,021 | 1/1988 | Ditzig | 206/387 |
| 4,726,972 | 2/1988 | Instance | 40/638 |
| 4,736,840 | 4/1988 | Deiglmeier | 206/313 |
| 4,776,463 | 10/1988 | Press | 206/425 |
| 4,793,480 | 12/1988 | Gelardi et al. | 206/312 |

FOREIGN PATENT DOCUMENTS

| | | | |
|---|---|---|---|
| 3114298 | 11/1982 | Fed. Rep. of Germany | 206/387 |
| 8202868 | 9/1982 | PCT Int'l Appl. | 206/387 |
| 8607182 | 12/1986 | PCT Int'l Appl. | 206/472 |

Primary Examiner—Jimmy G. Foster

[57] ABSTRACT

A storage case for disc-type media including a clip for retaining the case in a partially open position. Support means for the disc in the case is in the form of integral support members integrally disposed from the base of the case. A pick-up device for the storage disc is shown. Also shown is a holder for a pick-up device for the disc.

13 Claims, 22 Drawing Sheets

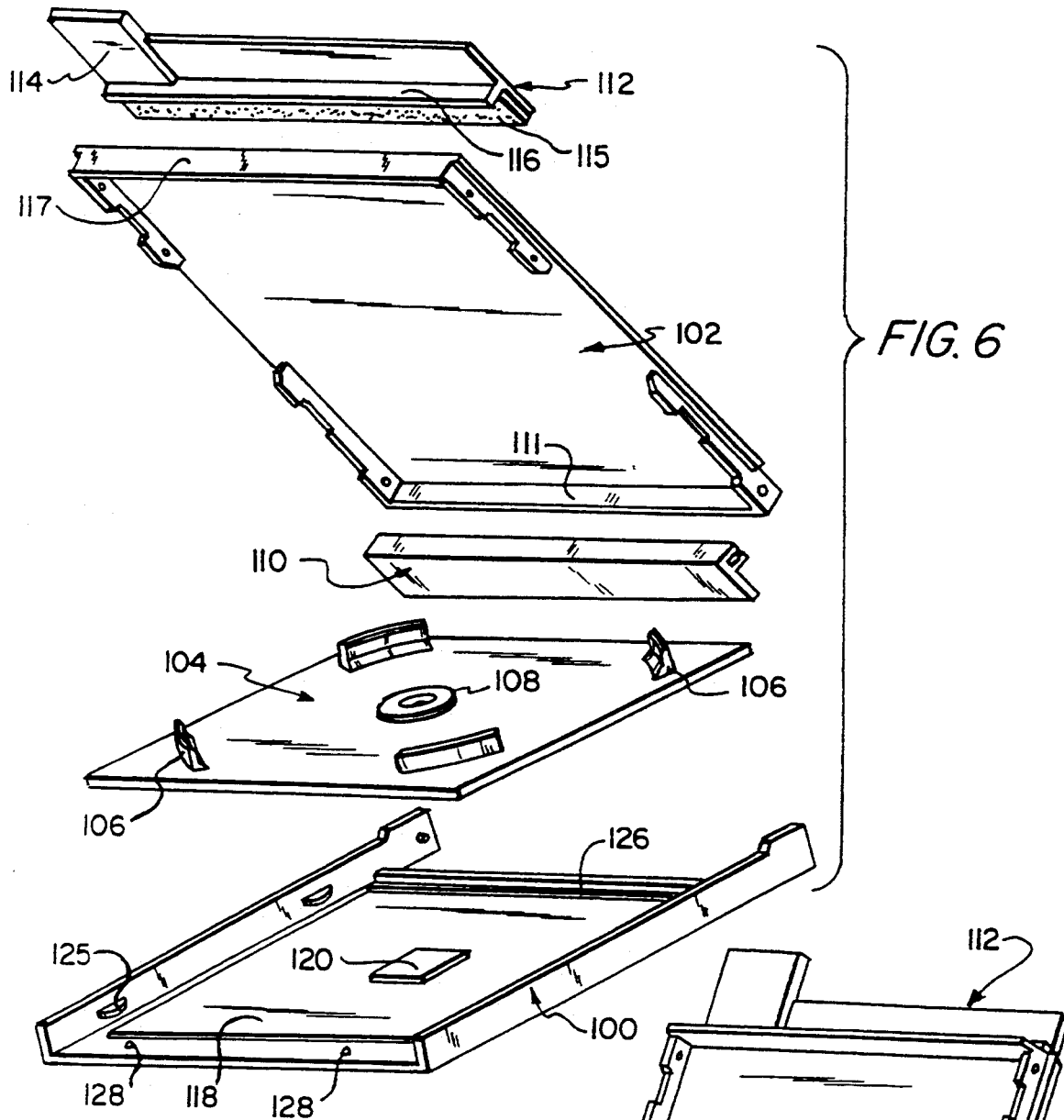
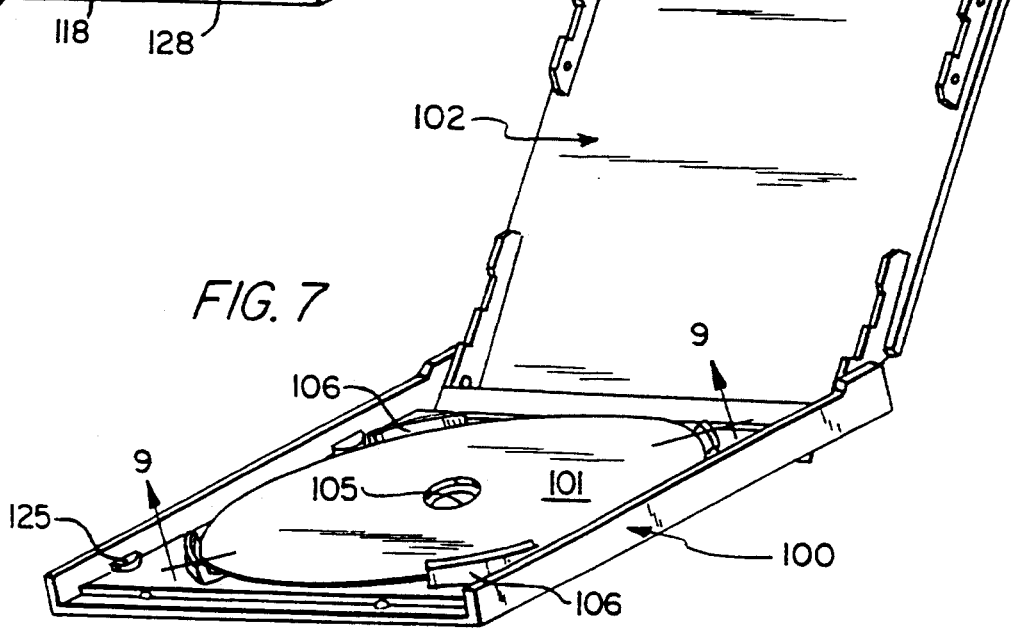
FIG. 6
FIG. 7

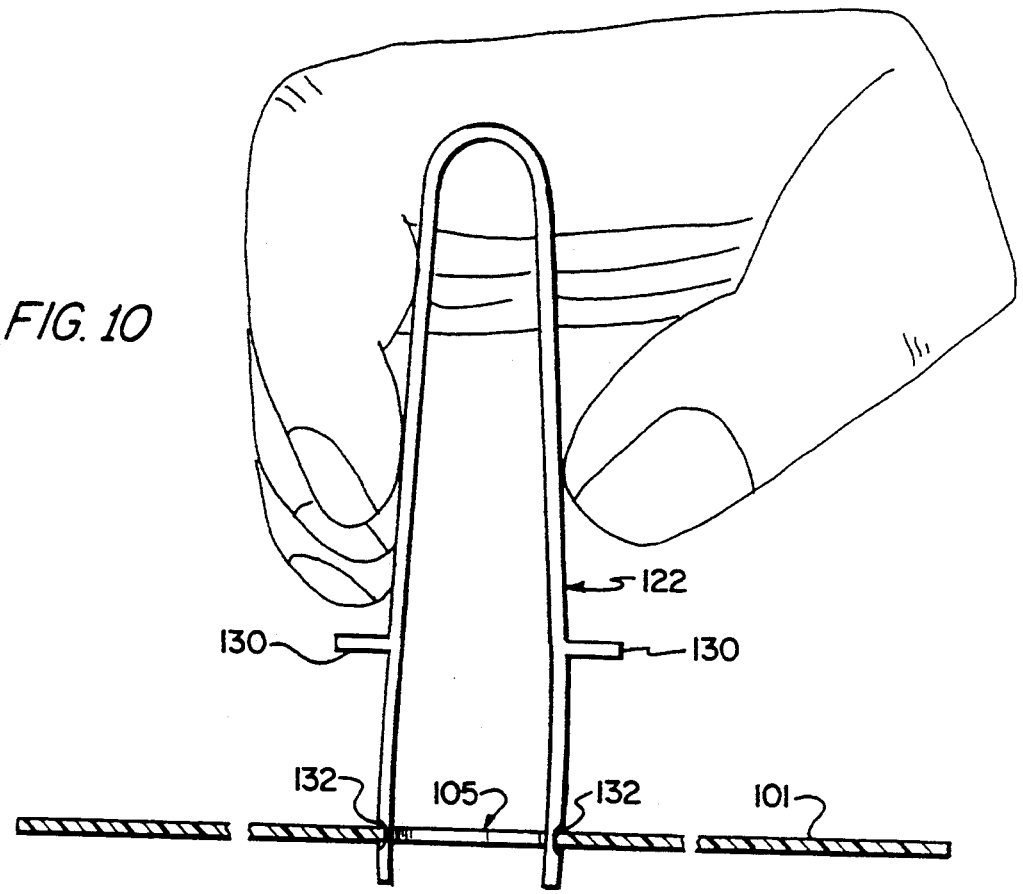
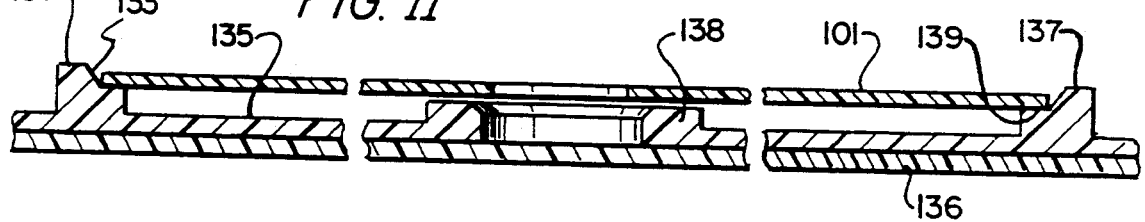
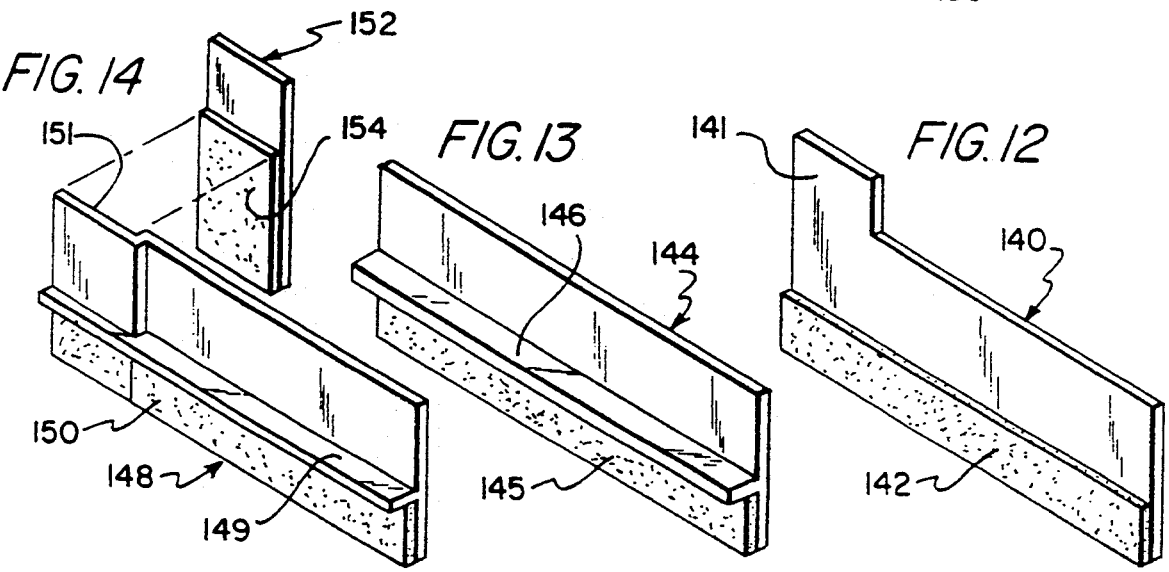

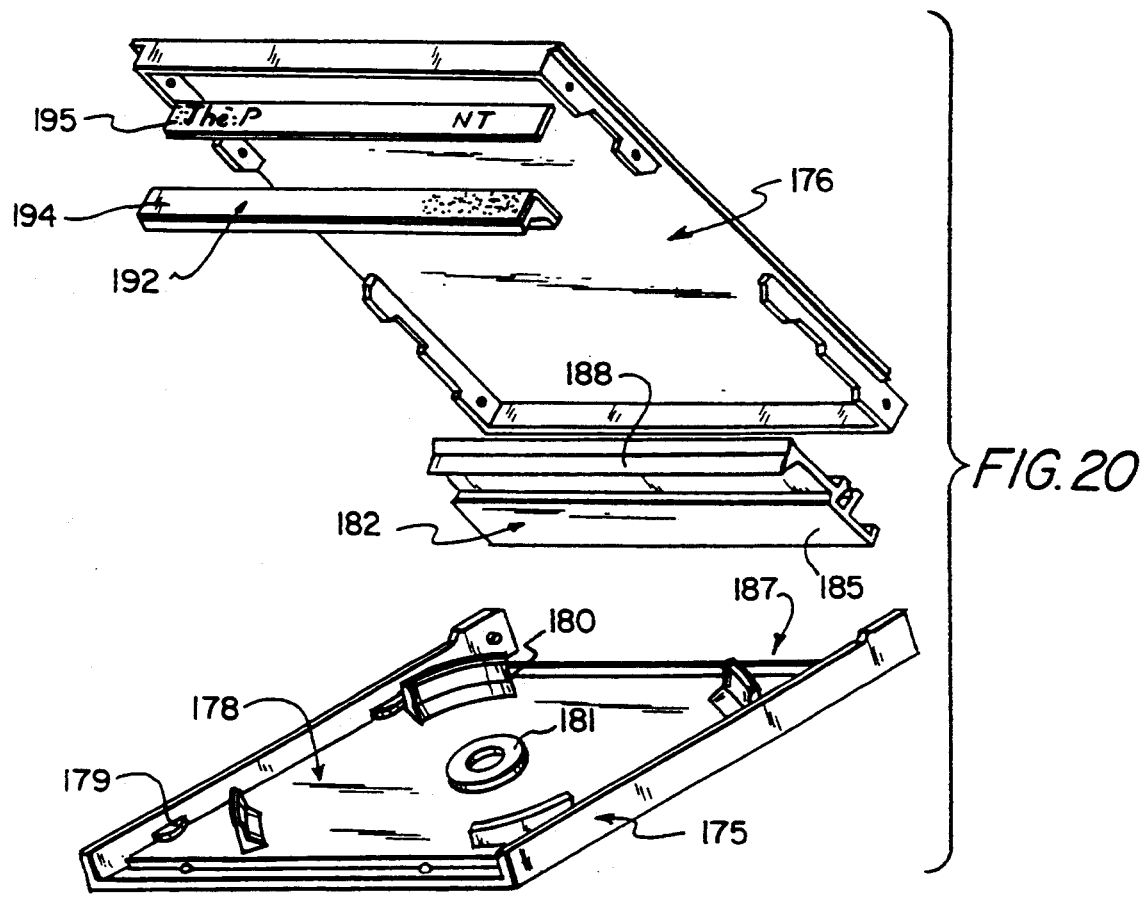
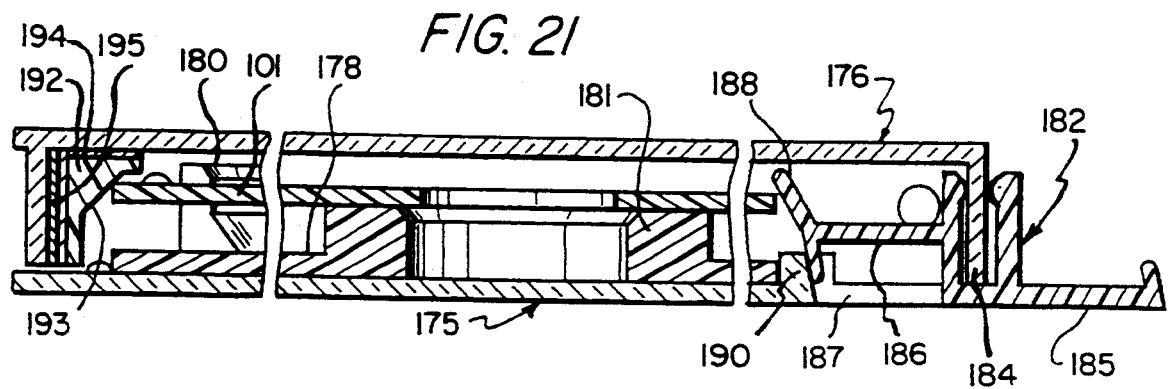
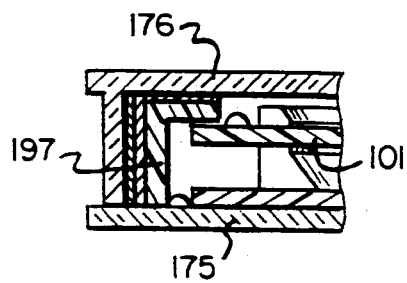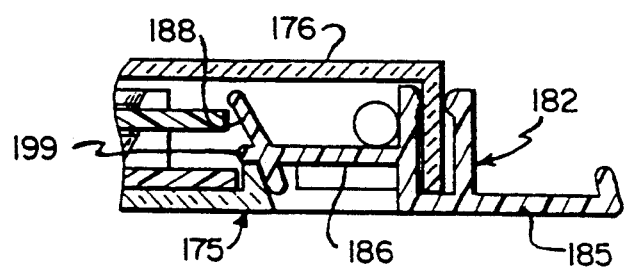

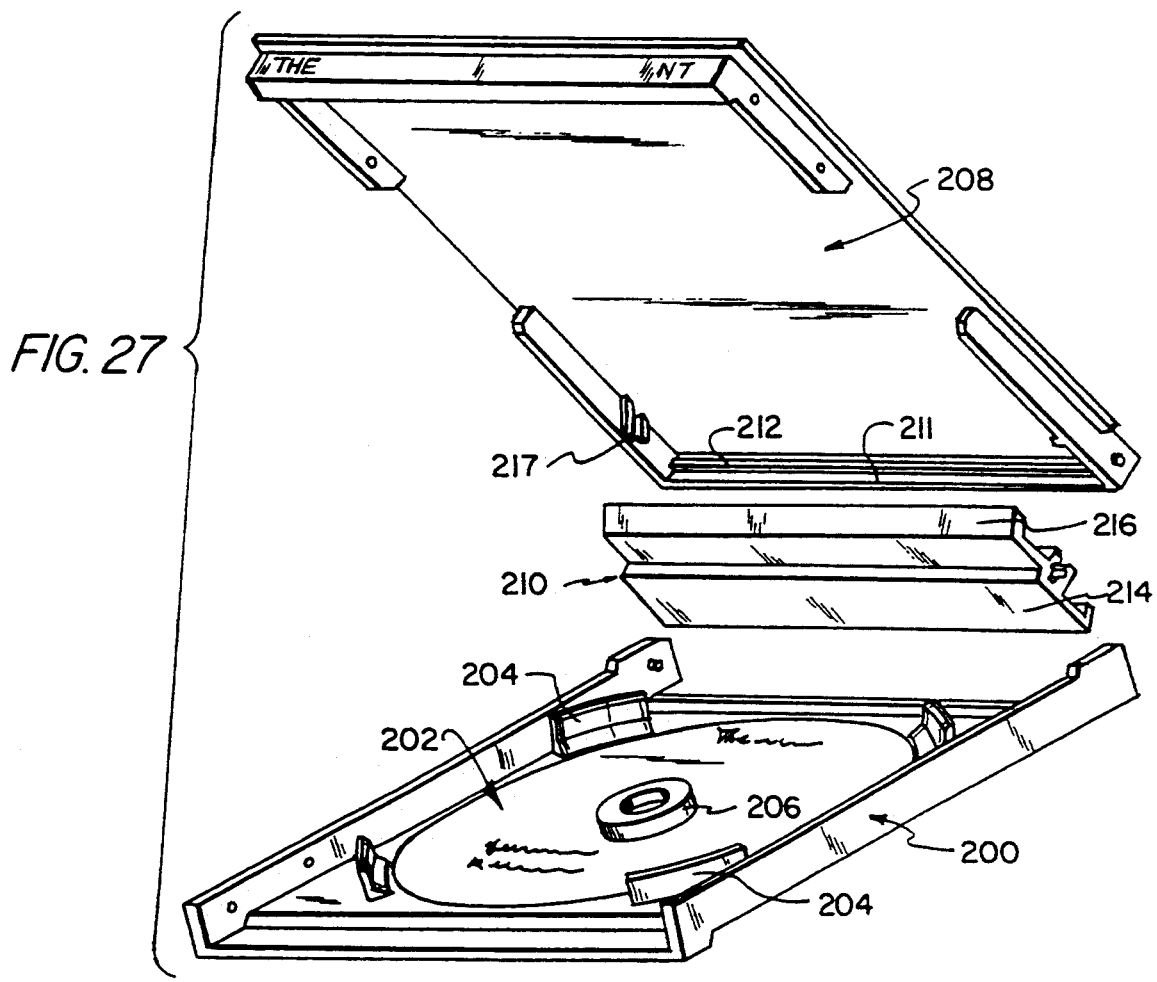
FIG. 27
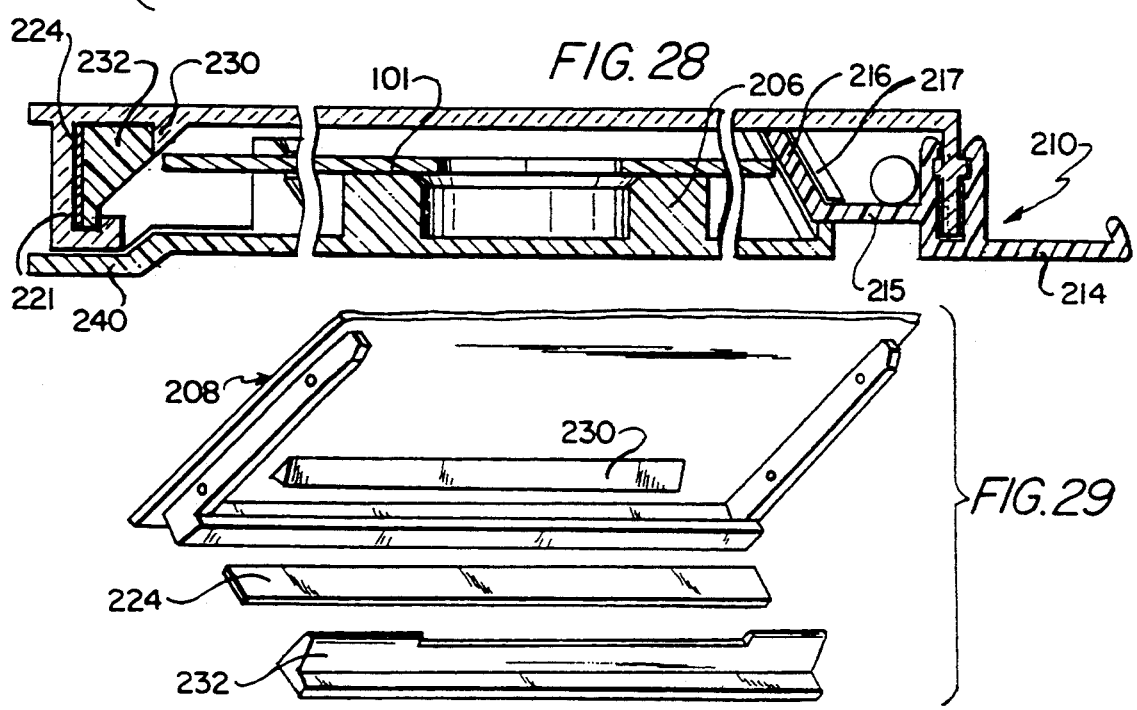
FIG. 28
FIG. 29

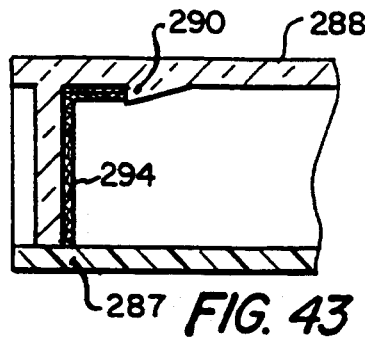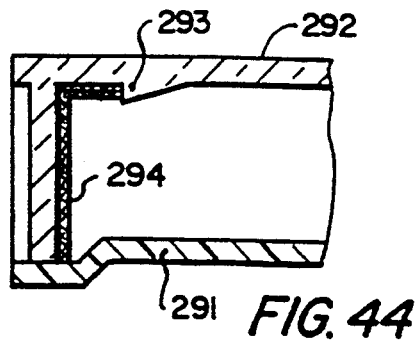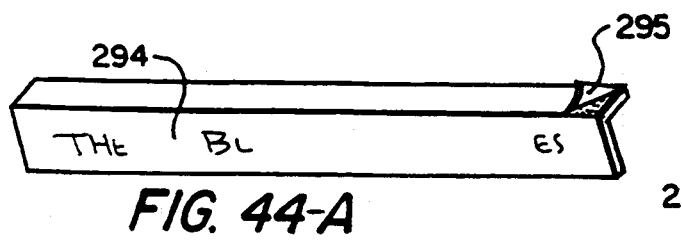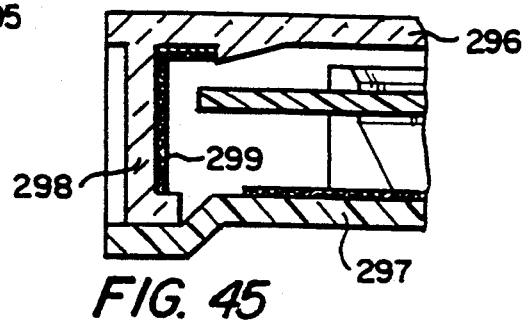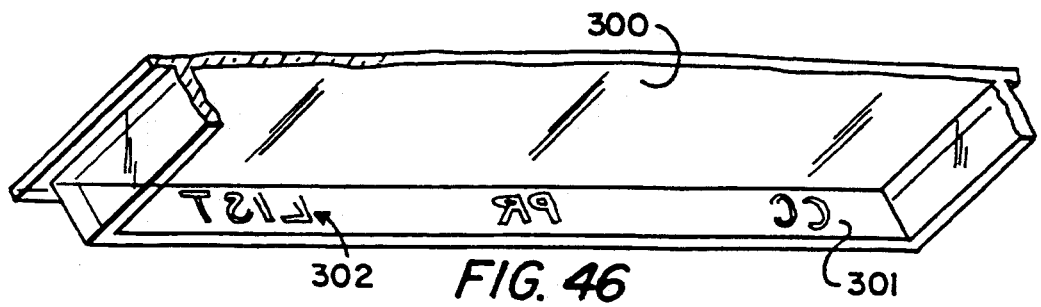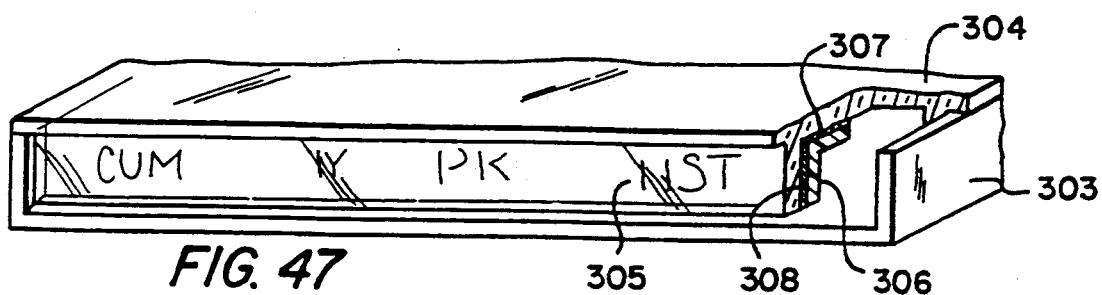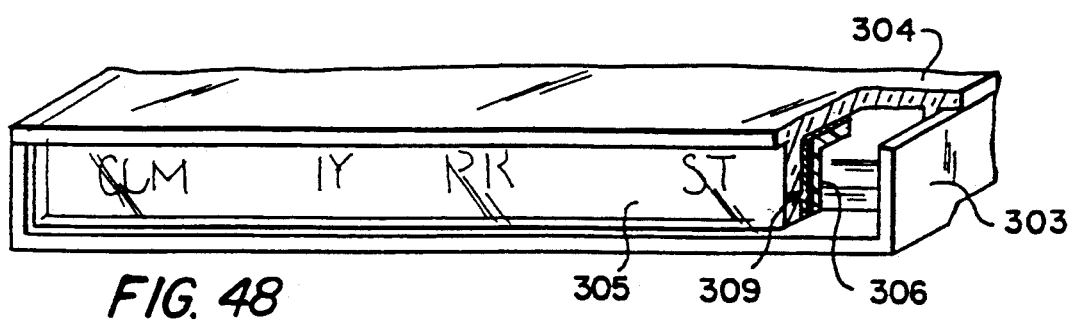

MEDIA STORAGE APPARATUS

This application is a continuation-in-part of the following earlier filed and copending applications on related subject matter: Ser. No. 07/206,033, filed Jun. 13, 1988 and now U.S. Pat. No. 5,135,106, Ser. No. 06/756,716, filed Jul. 18, 1985 and now granted as U.S. Pat. No. 4,714,157, Ser. No. 06/785,154, filed Oct. 7, 1985 and now granted as U.S. Pat. No. 4,750,611, and Ser. No. 07/131,358, filed Dec. 10, 1987, now abandoned, all entitled MEDIA STORAGE APPARATUS.

BACKGROUND OF THE INVENTION

The present invention relates in general to a storage apparatus for media. More particularly, the invention relates to improvements in storage cases or the like for the storage of discs including, but not limited to, compact audio discs that are now coming into extensive use.

In my prior related above-identified applications, there are described a number of different embodiments of storage cases or containers for these discs. It is the purpose of the present invention to now set forth additional embodiments that present further improvements in the state of the art.

Accordingly, it is an object of the present invention to provide an improved storage case or a container for media and in particular for compact discs.

Another object of the present invention is to provide an improved means associated with storage cases for facilitating opening thereof.

A further object of the present invention is to provide means for retaining a disc pick-up device so that it is in readiness for use.

SUMMARY OF THE INVENTION

To accomplish the foregoing and other objects, features and advantages of the invention, there is provided an improved form of storage case having disposed therein, in one embodiment, an integral support member for the disc. In accordance with another feature of the present invention there is provided an improved clip for use with the storage case and which enables the storage case to be lifted to a partially opened position. In accordance with another feature of the present invention there is provided a stick-on thumblift that is readily attached to the cover of the storage case and which enables one to easily lift the cover. In a related embodiment there is preferably a stick-on lift on both the cover and base to further facilitate opening. In accordance with still a further feature of the present invention there is provided a storage device for a disc pick-up device. This storage device is in the form of a storage compartment having a back wall that permits ready access to the pick-up device.

Further features of the present invention include a protector pad for the identification program sheet associated with the disc storage device, and adapted to prevent wearing through of the program sheet by contact with the disk pick-up device. Another feature of the invention is an improved pick-up device of forked construction, having ears disposed along the length thereof to assist in positioning of the disc. A related feature is the provision of one or more notches at the lower end of the legs of the pick-up device to assist in engagement with the center hole of the disc. In alternate embodiments described herein, the disc may be supported either at its periphery on support ribs, or at its center by means of a support hub. Another feature of the present invention is the provision of a stick-on thumblift that is readily attachable to the cover of the storage case, and which enables one to easily lift the cover. This stick-on thumblift also has provision for receiving indicia such as a number to identify the disc, particularly for storage purposes. Another feature of the present invention is an improved clip for use with the storage case, and which provides multiple functions. The improved clip enables the lid of the storage case to be held in a partially opened position. The clip also provides a seal in the closed position of the storage case, so that dust and dirt cannot enter the storage case. Lastly, the improved clip includes means for engaging the disc to retain the disc in firmly supported position on the disc support insert within the case. In this regard, the cover of the case preferably also includes an engaging member for engaging an opposite side of the disc for full and firm support thereof in the storage case. The particular member for engaging the other side of the disc is preferably also used in the storage case for support of the identification tag associated with the storage case.

Further features of the present invention include an identification of program part that is disposed in the disc storage device properly registered with the base thereof. The disc storage device preferably has a base and cover with respective rear walls thereof facing in a tapered manner so as to create a full rear wall when the case is closed. The cover pivots from the base and the base is provided with openings on either side at the rear thereof to accommodate the cover. There is embodiments of the invention are described in which there are means provided in the cover for receiving a card stock or the like upon which the name of the disc is recovered. This card stock may be in the form of an angled identification card and various embodiments are disclosed herein for securing this in place. In another embodiment of the invention, the front of the cover may have the name of the disc hot stamped therein. The base itself may be of a straight type or may be of a stepped form, both of which are illustrated in further detail herein.

In still further embodiments of the invention described herein, the cover and base of the storage case may be intercoupled by an improved hinge arrangement that in particular includes stop means for enabling the cover to be supported in a partially open position. The cover also preferably has a plurality of securing parts for holding the disc in fix position when the cover is closed. In one embodiment of the present invention, a separate program card is employed in the cover and upon which indicia may be provided such as a program of the disc. This card may also show the overall title or name of the disc.

In accordance with further features of the present invention, the base of the case may be provided with a disc support pedestal having a hole therein for accommodating a pick-up device. In still another embodiment of the present invention, the cover of the case may be hot stamped on its inner surface to indicate the contents of the case.

BRIEF DESCRIPTION OF THE DRAWINGS

Numerous other objects, features and advantages of the invention should now become apparent upon a reading of the following detailed description taken in conjunction with the accompanying drawings, in which:

FIG. 6 is an exploded perspective view of a further embodiment of the present invention;

FIG. 7 is a perspective view of the embodiment of FIG. 6 showing the case with its cover in open position;

FIG. 10 is a view illustrating the manner in which the pick-up device has its notches engaged with the disc for picking it up;

FIG. 11 is a cross-sectional view of an alternate insert construction;

FIG. 12 is a perspective view of one embodiment of the thumblift of the present invention;

FIG. 13 is a perspective view of another embodiment of the thumblift of the present invention;

FIG. 14 is a perspective view of still another embodiment of the thumblift of the present invention;

FIG. 20 is an exploded perspective view of another embodiment of the present invention;

FIG. 21 is a cross-sectional view of the embodiment illustrated in FIG. 20;

FIG. 22 is an alternate fragmentary view of the front retainer;

FIG. 23 is an alternate fragmentary view of the rear clip;

FIG. 27 is an exploded perspective view of a further embodiment of the present invention;

FIG. 28 is a cross-sectional view of the embodiment of FIG. 27;

FIG. 29 is a fragmentary exploded view showing the front retainer before engaging with the cover;

FIG. 43 is a fragmentary cross-sectional view of another embodiment of the storage case cover;

FIG. 44 is a fragmentary cross-sectional view of still another embodiment of the storage case cover;

FIG. 44A illustrates another form of identification angle card;

FIG. 45 is a fragmentary cross-sectional view of the storage case cover for another embodiment of the invention;

FIG. 46 is a fragmentary perspective view of a portion of a storage case cover in accordance with the invention;

FIG. 47 is a perspective view partially cut away illustrating another embodiment of the present invention;

FIG. 48 is a perspective view partially cut away of still another version of the present invention;

DETAILED DESCRIPTION

Figure 1:
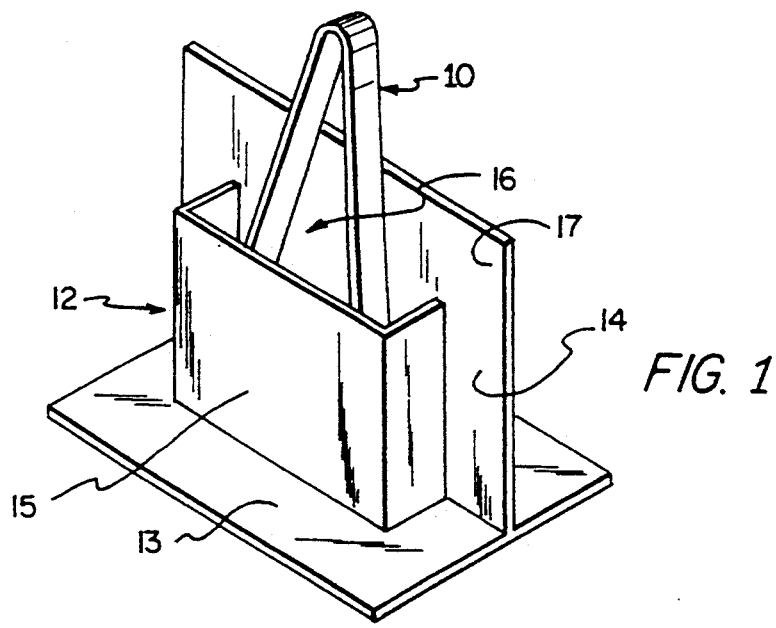
FIG. 1 is a perspective view of the storage device for the disc pick-up device.

Reference is now made to the perspective view of FIG. 1, which illustrates a pick-up device. This pick-up device may be of the type illustrated in my earlier co-pending application, such as is illustrated in FIGS. 15-21 of that application. The pick-up device 10 is contained within a storage member 12 which comprises a flat base 13, a rear wall 14, and a three-sided wall 15 which, with the wall 14, provides a storage compartment 16. The rear wall 14 forms a back stop and guide so that the pick-up device 10 may be easily inserted into the holder. It is noted that the top edge 17 of the wall 14 has a height so as to permit the device 10 to extend thereabove. This lowered wall 14 enables the pick-up device 10 to be free from obstruction to enable the user to lift the pick-up device out without any problem. The base wall 13 holds the holder in an upright position as illustrated.

The pick-up device 10, because it extends above the top edge 17 of wall 14, is readily available to be selected when desired. When the pick-up device is to be inserted back into the holder, it may simply be inserted into the compartment 16 against the rear wall 14 and held in the general position illustrated in FIG. 1.

Figure 2A:
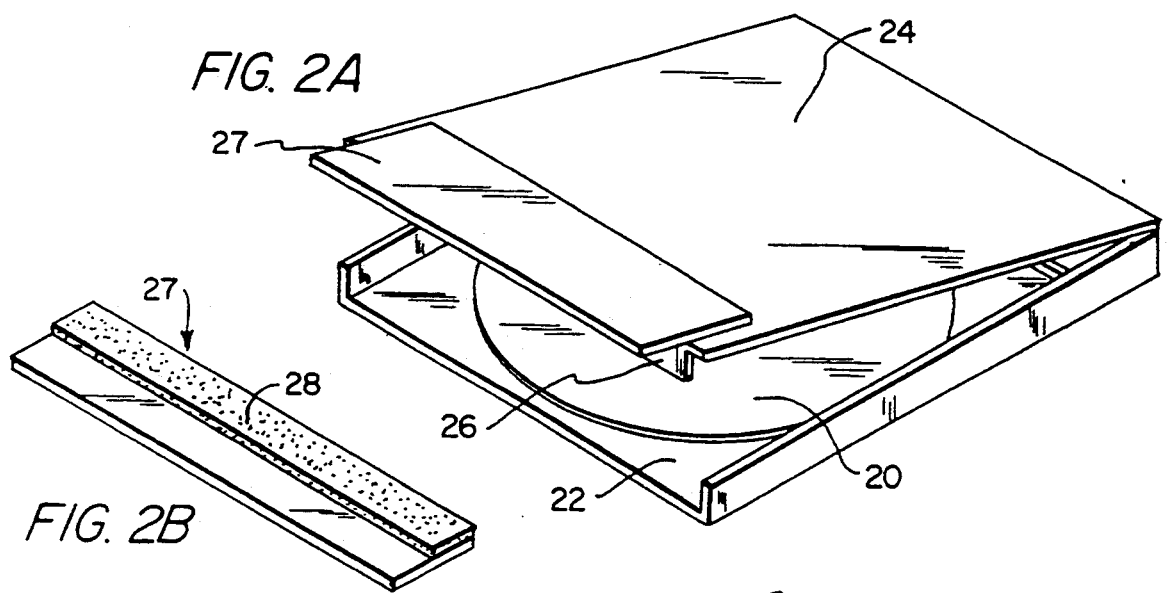
FIGS. 2A–2C illustrate stick-on thumblift means associated with the disc storage case, illustrating the lift device associated with the cover in one embodiment and in another embodiment associated with both the cover and base.
Figure 2B:

FIG. 2A illustrates a disc storage compartment for the disc 20. In FIG. 2A this is shown as comprising a base 22 and a cover or lid 24. The lid 24 has a downwardly depending front wall 26 that normally closes with the base. FIG. 2B illustrates the thumblift 27 with the double sticky piece 28. From the position illustrated in FIG. 2B, the thumblift 27 is inverted and placed on the top front edge of the lid 24 extending frontwardly therefrom, as illustrated in FIG. 2A. This enables one, once the thumblift 27 is inserted in place as in FIG. 2A, to easily lift the lid 24.

Figure 2C:
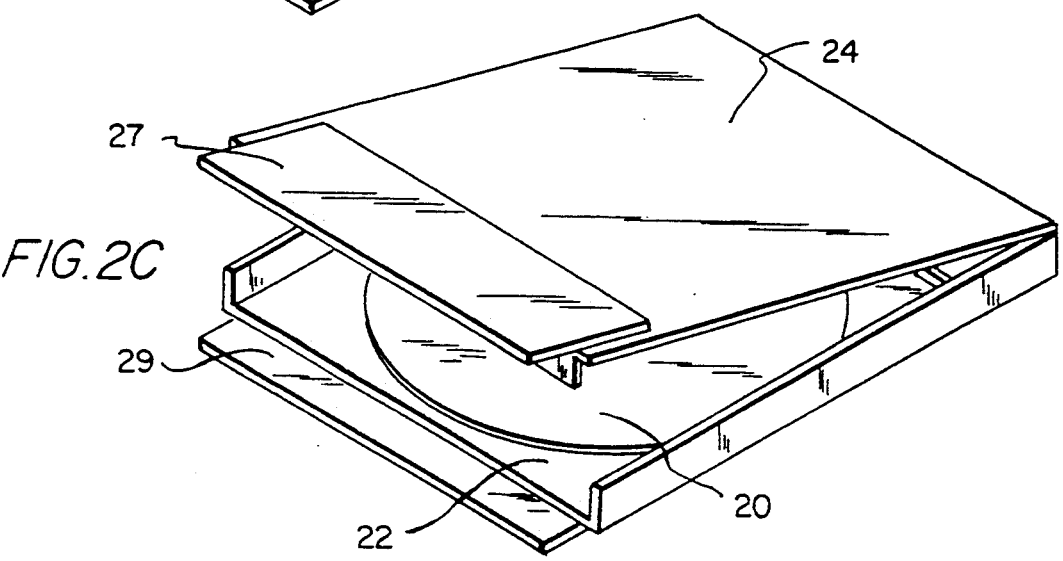

FIG. 2C illustrates an alternate embodiment in which there is also shown the thumblift 27 secured to the lid 24. However, there is also shown a substantially identical thumblift 29 secured to the underside of the base 22 of the disc case. The thumblift 29 also, of course, has a sticky back and thus is substantially identical to the member illustrated in FIG. 2B. In the embodiment of FIG. 2C there are thus two pairs of thumblifts, one on the lid and one on the base. This is desirable in instances where additional assistance may be needed to open the storage case.

Reference is now made to FIGS. 3A-3D. This embodiment of the invention illustrates a storage case which is comprised of a base 30 and cover or lid 32. It is noted that the base 30 has extending from the bottom thereof a small upright wall 33. In front of the wall 33, the base 30, of course, has a bottom flat surface upon which the disc or insert may rest. Behind the wall 33 at the bottom of the case there is an open space at 34.

Figure 3A:
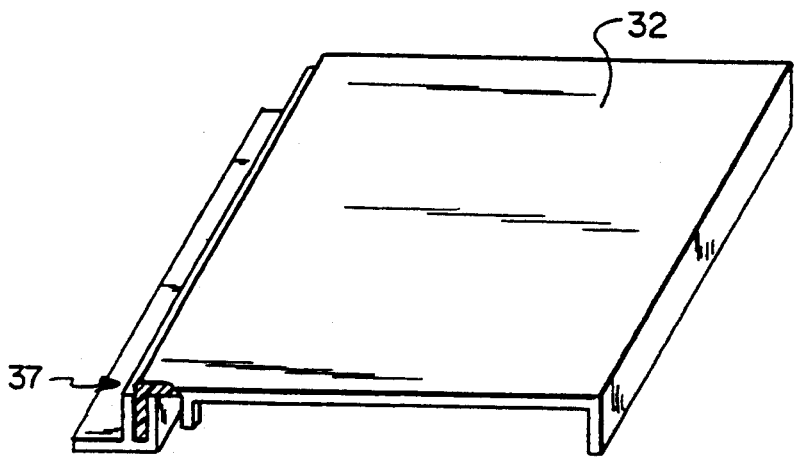
FIGS. 3A–3D illustrate another embodiment of the storage case employing a plastic clip that enables the storage case to be open to a partially open tilted back position.
Figure 3B:
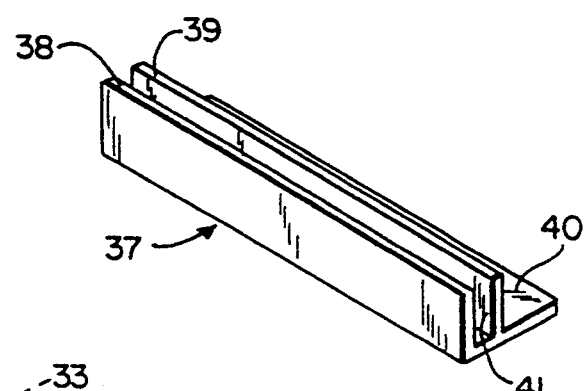
Figure 3C:
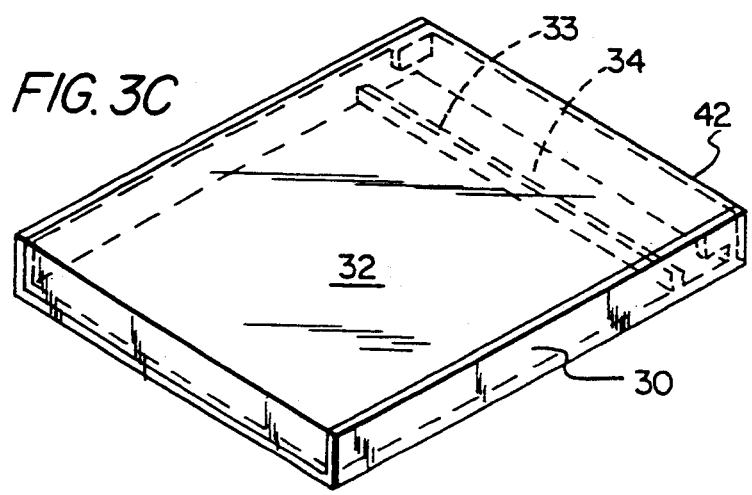
Figure 3D:
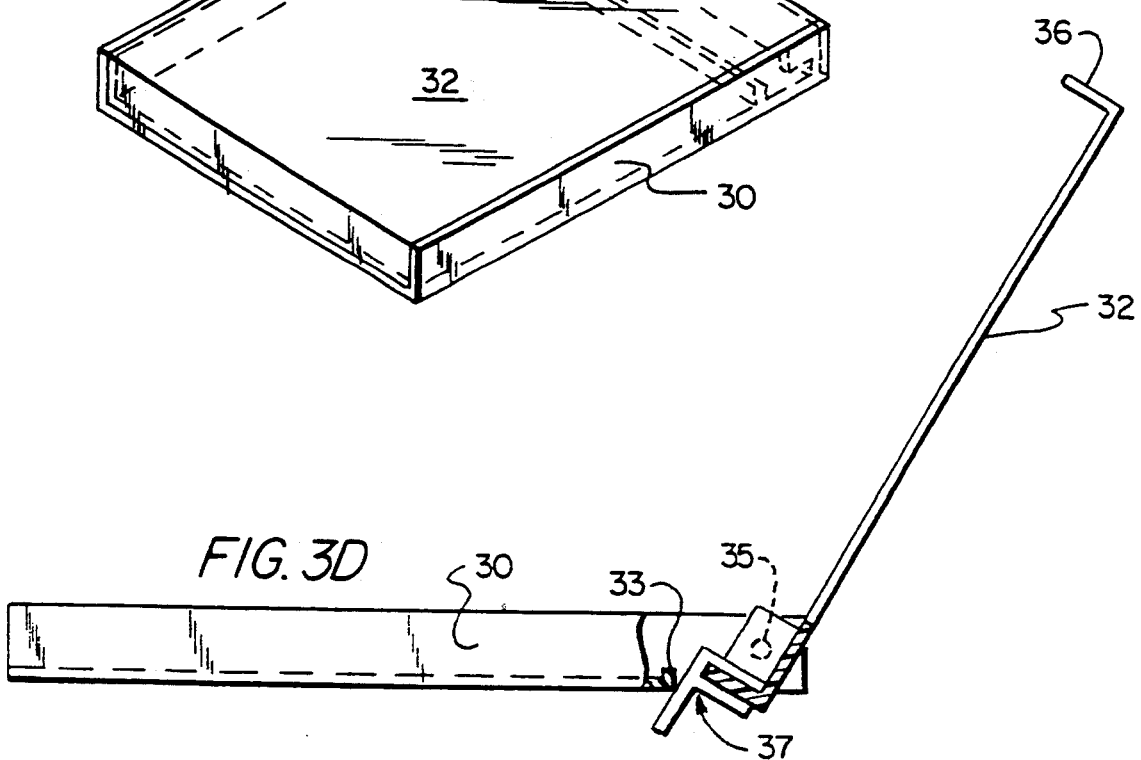

It is also understood in the embodiment of FIGS. 3A-3D that there is some type of a hinging means not specifically illustrated but identified schematically by the hinge point 35 in FIG. 3D. It is also noted from FIG. 3D that the cover 32 has a front covering member 36.

Now, with regard to the embodiment of FIGS. 3A-3D, there is provided a plastic clip 37 that is comprised of upright walls 38 and 39 and a rearwardly directed wall 40. The wall 40 is rearwardly directed such as in the position of FIG. 3A. The walls 38 and 39 form a channel 41 and, as illustrated in FIG. 3A, this channel is adapted to receive the rear wall 42 of the lid 32.

In the normal closed position of the storage case, the wall 40 is directed rearwardly. However, when the case is opened, the clip 37 permits the lid 32 to move to a partially opened position, as clearly illustrated in FIG. 3D. The wall 40 contacts the upright wall 33 and limits the open position of the lid to that illustrated in FIG. 3D. As indicated previously, the rear of the base of the case is open at 34 and this permits the clip 37 to clear the sides of the base and only contact something when it comes into contact with the upright wall 33.

Figure 4A:
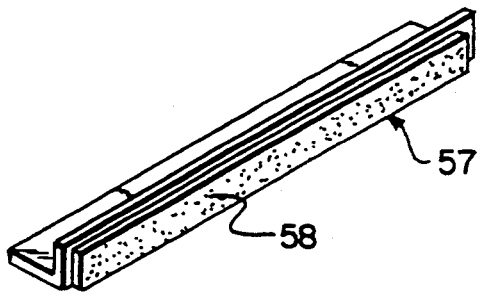
FIGS. 4A–4E illustrate a further embodiment of the present invention in the form of an angle member at the rear of the case which also permits the case to be maintained in a partially opened position.
Figure 4B:
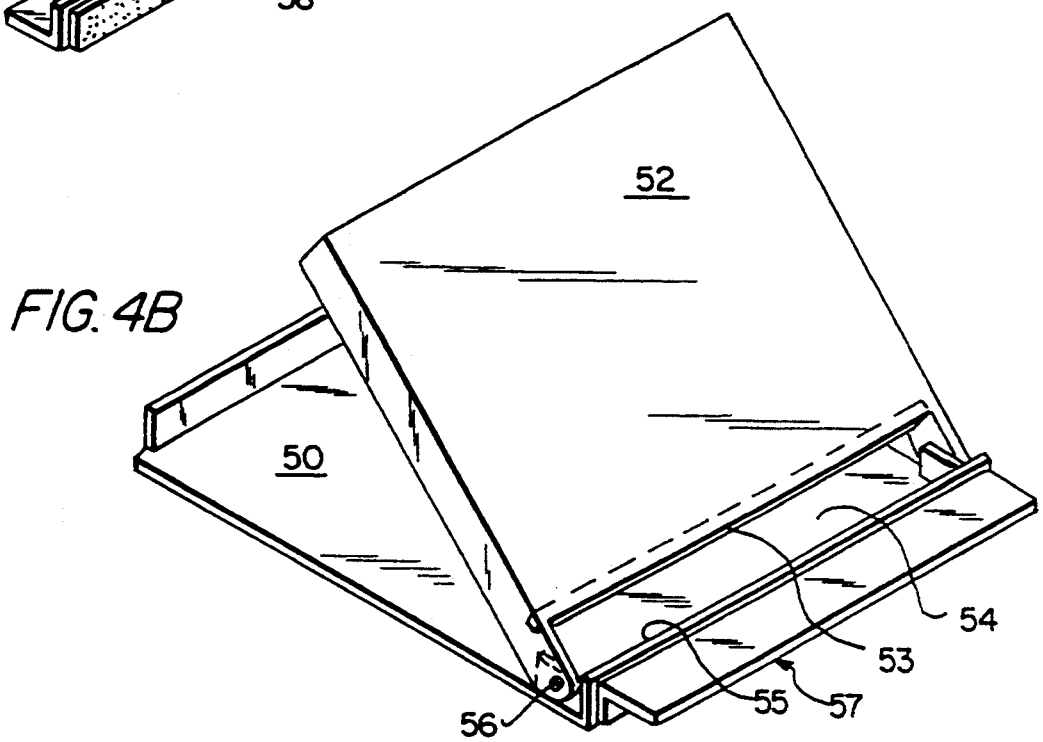

FIGS. 4A-4E illustrate further features of the present invention. In particular, FIG. 4B illustrates a storage compartment in which the cover and base have essentially been reversed in comparison to the case illustrated in FIG. 3C. As far as the orientation is concerned in FIG. 4B, the case comprises a base 50 and a cover 52. The cover 52 has an inwardly directed wall 53 and is open at 54. The rear wall 55 of the base supports hinging means to enable the cover to be pivotally connected to the base. This hinging means is illustrated at 56.

In accordance with the invention as illustrated in FIG. 4A there is provided a plastic angle member 57 that has secured to one leg thereof a sticky back material 58 which may be a sticky back tape having adhesive on both sides. FIG. 4A illustrates the plastic angle with the sticky back applied. FIG. 4B illustrates the plastic angle member 57 secured to the rear wall 55 of the base.

Now, in the closed position of the case, the plastic angle member 57 does not interfere at all with the operation of the case. The case may be opened to a rearwardly tilted position in which case the wall 53 contacts the top surface 58 of the angle member 57. In FIG. 4B the lid is shown in a partially opened position. However, if the lid is moved rearwardly, then the lid is permitted to rotate past a 90° opened position to a position in which the wall 53 finally contacts the surface 58 of the angle member 57.

Figure 4C:
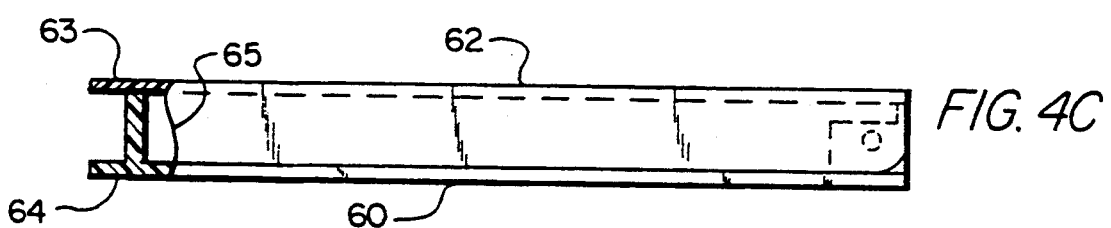

FIG. 4C shows another feature of the present invention in which there is provided a base 60 and a cover or lid 62. It is noted that the base 60 has a front wall 65 and there is a thumblift associated with both the cover and base. As illustrated in FIG. 4C, there is an integral extension 63 of the cover that forms a thumblift. Similarly, there is an extension 64 of the base 60 that also forms a thumblift. Both of these are integrally molded into the disc case.

Figure 4D:
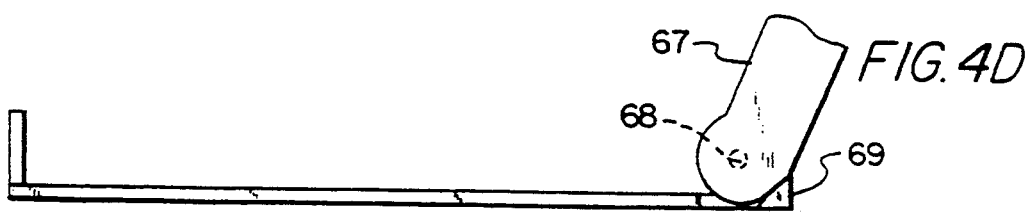
Figure 4E:
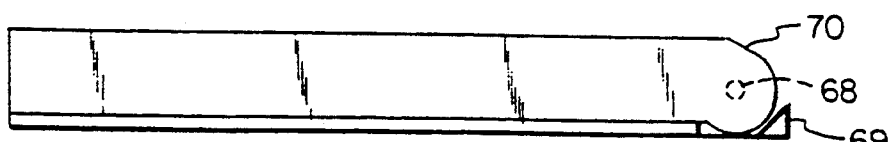

FIGS. 4D and 4E illustrate a further embodiment of the present invention. In FIGS. 4E and 4D there is shown a fragment of the base 66 and cover 67. There is a pivot hinge at 68 between the cover and base. The base is provided with an integral lid stop 69. This is molded directly into the base of the case. This keeps the cover from falling all the way back. FIG. 4D illustrates the cover 67 and its rearward tilted position with the cover preferably being provided with a flat 70 that is adapted to engage the stop 69 as illustrated in FIG. 4D. FIG. 4E illustrates the case in its closed position in which the flat 70 is out of engagement, of course, with the stop 69.

Figure 5A:
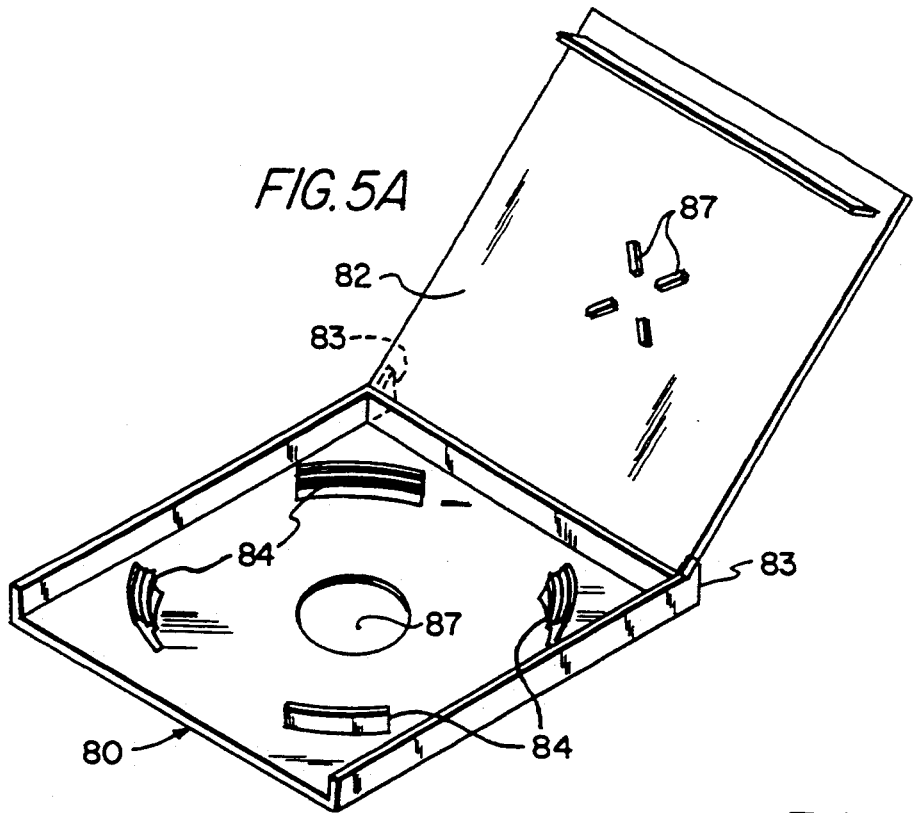
FIGS. 5A–5E illustrate a further embodiment of the invention in the form of an integral support member for the disc within the storage case along with associated retaining means preferably integral with the case cover or width.

Reference is now made to FIGS. 5A-5E, which illustrate further features of the present invention. FIG. 5A illustrates a storage case with integral disc support. In my prior application there is provided a separate insert. However, in accordance with the features described herein, the support for the disc is now integral with the storage case base.

Thus, there is illustrated a storage case base 80 and associated lid 82. In the embodiment of FIG. 5A there is also provided a back stop 83 so that the lid remains in a backward angular position. Extending upwardly from the floor of the base 80 are four upright support members 84. Each of these support members is tilted, as illustrated in FIGS. 5C and 5D. FIGS. 5C and 5D are substantially identical, with the exception that the embodiment of FIG. 5C also includes the ledge 85 for supporting the disc 86. As indicated herein, these uprights or support members 84 are disposed at an angle and are molded directly into the base of the plastic disc case. There is also, as illustrated, the preferred hole 87 in the base. These support members hold the disc in an elevated position such as illustrated in either FIG. 5C or FIG. 5D.

Figure 5B:
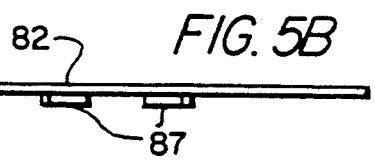
Figure 5C:
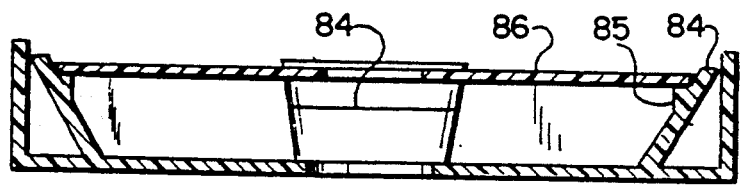
Figure 5D:
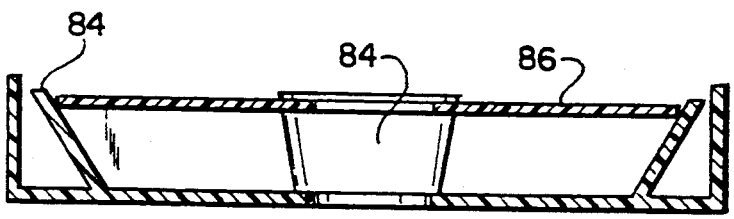

Now, with regard to FIG. 5B, it is noted that the lid 82 has plastic ridges 87, as also illustrated in FIG. 5A. These extend downwardly and contact the center of the disc to hold the disc in place when the cover is closed. This prevents the disc from moving when the container is in its closed position. The ridges 87 contact only the center of the disc and thus do not do any damage to the media part of the disc.

Figure 5E:
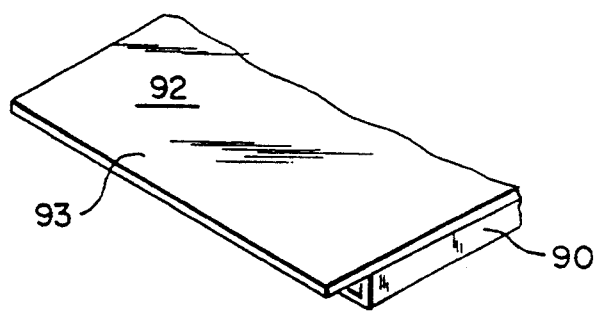

Finally, FIG. 5E shows a case base 90 and a lid 92 with the lid 92 having an extension 93 that forms a thumblift that is directly molded into the lid of the case. This permits the lid to be lifted with ease.

Reference is now made to the embodiment of the invention illustrated in FIGS. 6-10. The disc storage case is illustrated herein as including a base 100 and a cover or lid 102. The cover or lid 102 is adapted to pivot relative to the base 100. FIG. 6 shows the parts in an exploded perspective view. FIG. 7 shows the cover 102 engaged with the base 100, with the cover 102 in its tilted back open position enabling ready access to the disc 101.

FIG. 6 also shows the insert 104, which is the support member for the disc 101. The disc 101 is illustrated in FIG. 7 but is not illustrated in FIG. 6. The insert 104 is provided with four spacedly and peripherally disposed ribs 106. The insert 104 also includes a center hub 108.

Figure 8:
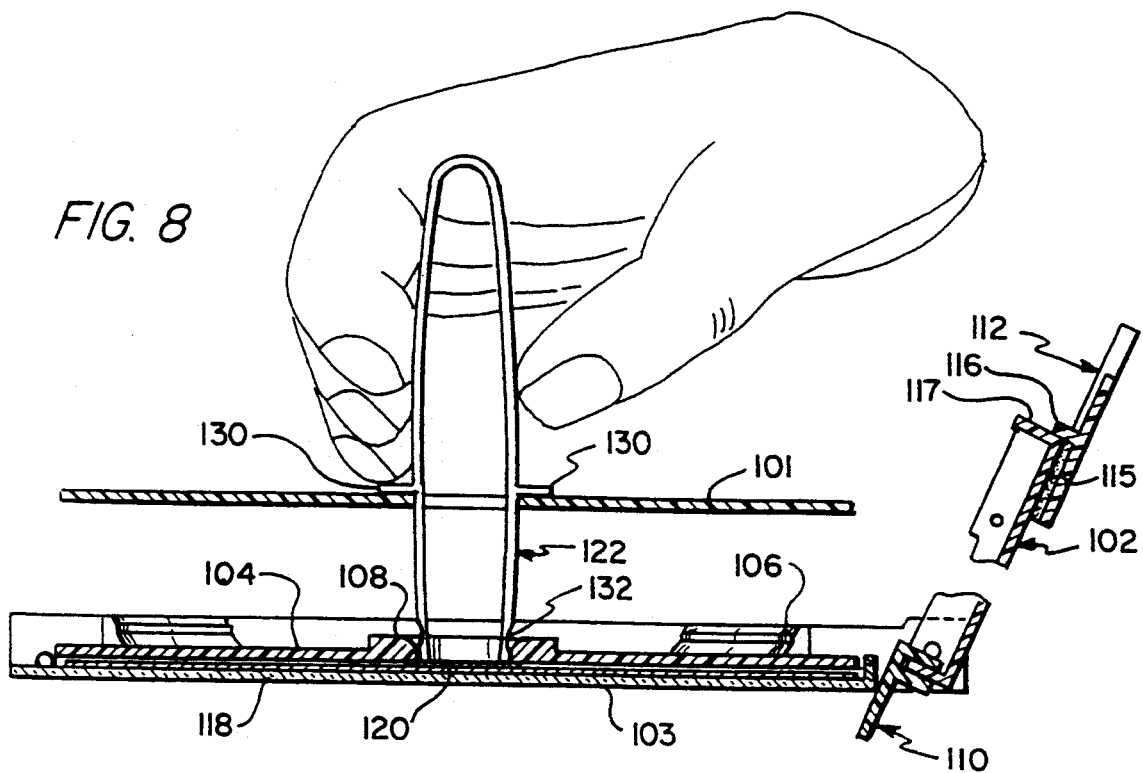
FIG. 8 is a cross-sectional view taken through the embodiment of FIGS. 6 and 7 and illustrating the disc in an initial position for transfer into the case.

FIG. 6 also illustrates a clip 110 that is adapted to engage with the rear wall 111 of the cover 102. The clip 110 enables the storage case to be held in a partially open position by means of a wall thereof engaging an edge defining the bottom of the base 100. In this regard, refer to FIG. 8, showing the engagement of the clip 110 with the base bottom wall 103.

Figure 19:
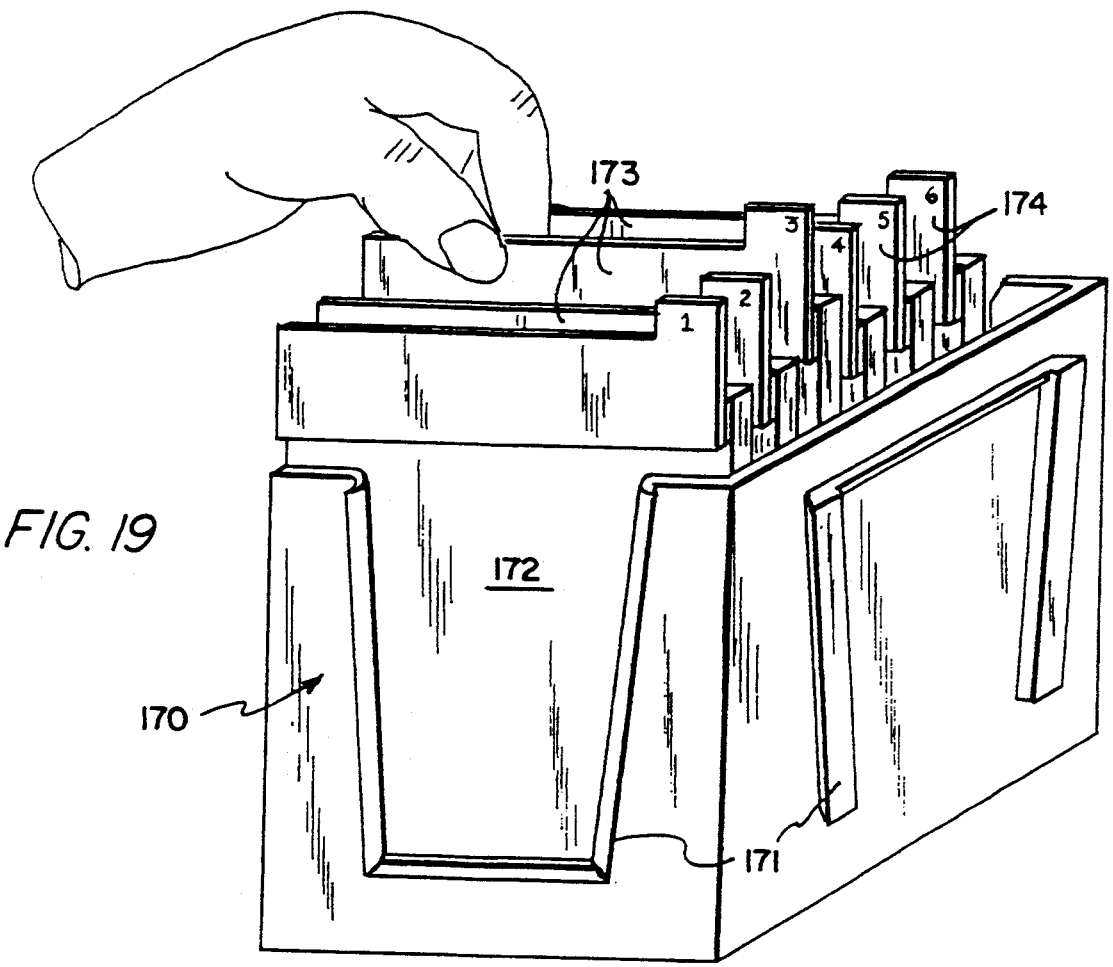
FIG. 19 is a perspective view showing a series of storage cases in an overall storage member.

Also illustrated in this embodiment is the thumblift 112, which has an enlarged and thicker tab 114 for the purpose of providing indicia such as the numbering illustrated in FIG. 19. In this regard, also refer to the indicia or numbering illustrated in FIGS. 15 and 16, to be described in further detail hereinafter. The thumblift 112 includes a sticky-back adhesive strip 115, along with an elongated rib 116. The rib 116 is adapted to be positioned against the front wall 117 of the cover 102, to assist in positioning of the thumblift on the cover. Also refer to the cross-sectional view of FIG. 8, which shows the rib 116 in relation to the wall 117. FIG. 8 also illustrates the adhesive strip 115.

FIG. 6 also illustrates, within the base 100, the identification program sheet 118 associated with the storage case. The program sheet 118 has on its side, and viewable from the exterior of the case, information about the content of the compact audio disc. One of the important features of the present invention is a protector pad 120, which is adapted to be positioned under the hole 105 in the disc 101. The pad 120 prevents the pick-up device 122 from scratching and eventually wearing through the sheet 118. In this regard, in FIGS. 8 and 9, note the position of the pad 120 relative to the hole in the disc as well as the hole in the insert hub 108. Also note, in FIGS. 8 and 9, the manner in which the pick-up device 122 is moveable across the pad for engagement with and disengagement from the disc 101. This constant movement would cause wearing of the identification sheet. However, the protector pad 120 prevents this.

FIG. 7 shows the insert 104 in place within the base of the storage case. In this regard, the storage case is provided with guide tabs 125 for guiding the insert into place. It is noted that the tabs are spaced from the bottom wall so that the insert can fit. The base is also provided with a rear lip 126 for retaining one end of the insert. At the front side, there are provided relatively small retaining bumps 128. In this regard, refer to FIG. 7.

Figure 9:
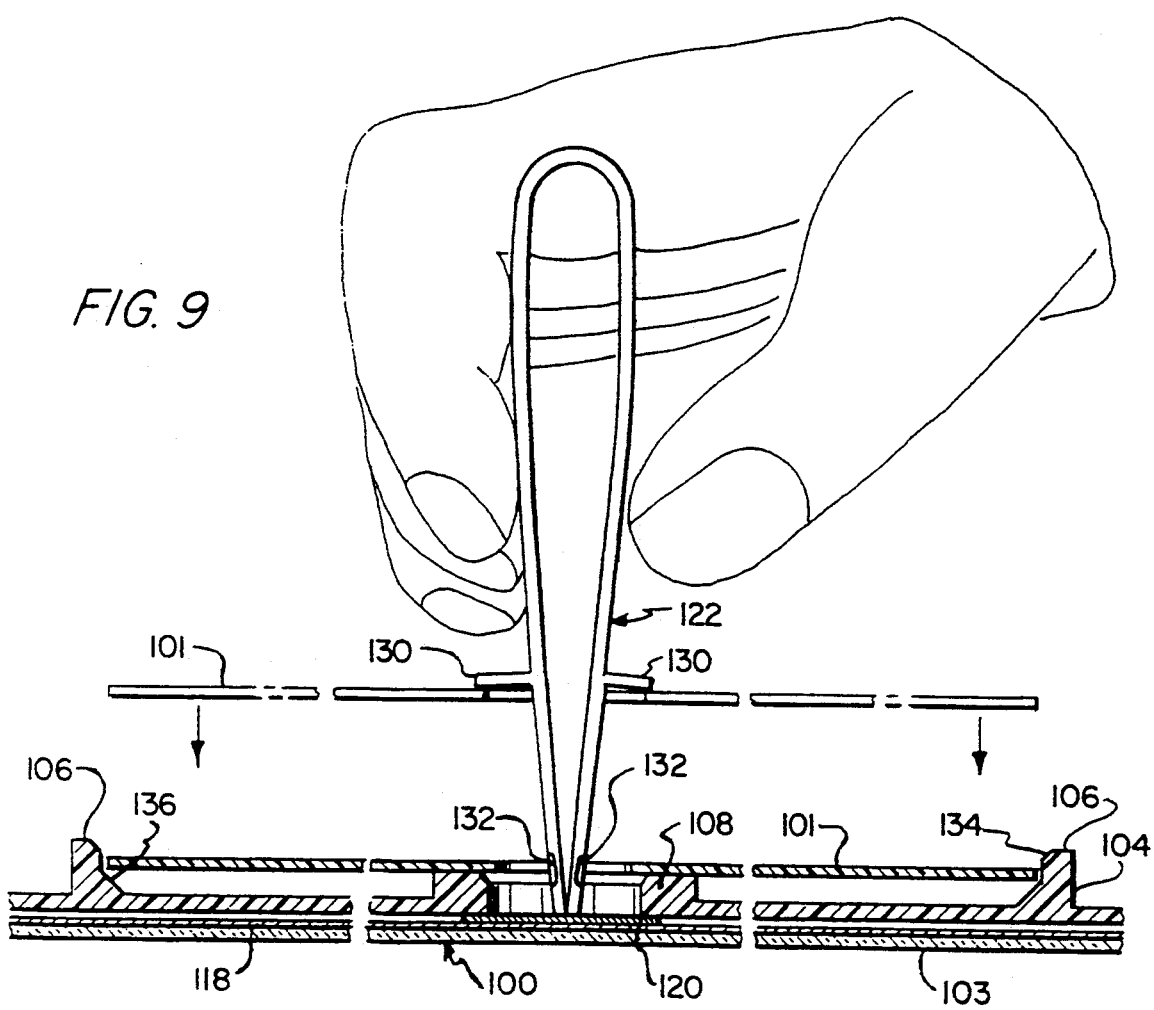
FIG. 9 is a cross-sectional view such as taken along line 9—9 of FIG. 7 and illustrating the pick-up device having been deflected to enable the disc to be dropped onto the insert.
Figure 17:
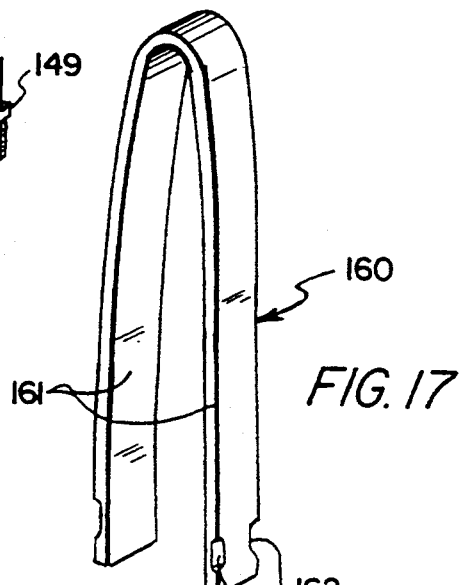
FIG. 17 shows an alternate embodiment of the pick-up device without ears.

FIGS. 8-10 show the pick-up device 122. The pick-up device 122 is of forked construction. Also refer to the perspective view of FIG. 17, showing the pick-up device without ears. FIGS. 8-10 show the pick-up device having a pair of oppositely disposed and directed ears 130. These ears 130 prevent the disc from going any higher on the fork. The ears 130 are engaged primarily when the disc is removed from the disc player. In this regard, FIG. 8 shows the disc being supported in a position in which it has just been removed from the player, and is now to be inserted into the storage case.

The pick-up device 122 is also provided with oppositely disposed and directed notches 132. In the position of FIG. 9, the pick-up device has been compressed so that it releases from the disc and the disc is permitted to drop onto the insert, for example to the position shown in cross-section in FIG. 9. In this regard, it is noted that the ribs 106 have a top bevel at 134, noted in FIG. 9, that is used to guide the disc down. The ribs 106 also have a lower disposed bevel at 136 to keep the disc from touching the bottom wall of the insert. Between the bevels 134 and 136 there is a vertical segment that keeps the disc from shifting from side to side. This is most clearly illustrated in FIG. 9.

FIG. 10 illustrates the pick-up device with its notches 132 engaging the hole 105 in the center of the compact disc 101. The notches 132 are useful in providing firm contact between the pick-up device and the disc. It is furthermore noted that the pick-up device is constructed to normally be spread a distance greater than the hole in the compact disc and thus has to be compressed to arrive at the position illustrated in FIG. 10 herein.

In the embodiment illustrated in FIG. 9, it is noted that the disc 101 rests upon the hub 108. In this embodiment, the primary support for the disc is at the hub, and in this way there is little interference at the periphery of the disc.

Reference is now made to FIG. 11 for a fragmentary view of an alternate embodiment of the invention. FIG. 11 shows primarily an alternate construction of the insert. In FIG. 11, there is disclosed an insert 135 having a base wall 136 and a plurality of spacedly and peripherally disposed support ribs 137. There is also a centrally disposed hub 138. In this particular embodiment, it is noted that the disc 101 is supported not at its center area, but at its periphery. This support is provided by means of a ledge 139. This embodiment also includes a bevelled wall 133 that is used to get the disc onto the seat provided by the ledge 139. In FIG. 11, it is noted that, as indicated previously, there is a space between the hub 138 and the disc 101. The primary support for the disc is thus at its periphery at the ledge 139 in this particular embodiment.

Reference is now made to FIGS. 12–16 for a number of different embodiments of the thumblift device. A first embodiment of the invention is illustrated in FIG. 12. The thumblift 140 includes a number tab 141 at one end thereof. The number is provided on the reverse side to that illustrated in FIG. 12. Also used on the thumblift 140 is the double-sided tape strip 142.

FIG. 13 shows an alternate embodiment of the thumblift. In this embodiment, the thumblift 144 may have indicia thereon, but there is not illustrated any separate enlarged tab. FIG. 13 does, however, illustrate the elongated adhesive strip 145 and furthermore illustrates the rib 146 similar to the rib 116 previously discussed in the embodiment of FIG. 6. The rib is used for positioning of the thumblift relative to the storage case cover.

In FIG. 14 there is shown the thumblift 148. On the thumblift 148 is the elongated rib 149 and the adhesive strip 150. The thumblift 148 is provided with a recess at 151 for accommodating a separate number piece 152. On the number piece 152 is a double-sided adhesive tape 154. This arrangement enables one to attach the thumblift to the case and separately attach the number piece to the thumblift.

Figure 15:
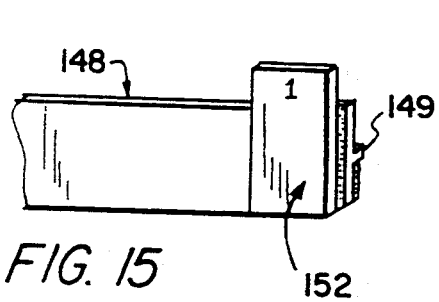
FIG. 15 is a front perspective view of the thumblift of FIG. 14.

FIG. 15 is a perspective view of basically the same thumblift as illustrated in FIG. 14. FIG. 15 shows the number piece 152 with numbering thereon. FIG. 15 also shows the two pieces of double-sided tape, one for enabling securing of the thumblift to the case, and the other for enabling securing of the number piece to the thumblift.

Figure 16:
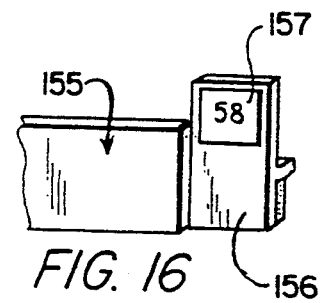
FIG. 16 is still another embodiment of the thumblift.

FIG. 16 shows still a further embodiment of the present invention, including a thumblift 155 having a recess therein with an integral number wall 156. In FIG. 16, note the numbering at 157. This embodiment also includes the positioning rib and the rear double-sided tape for attachment of the thumblift to the storage case, and in particular the cover thereof.

FIG. 17 shows an alternate embodiment of the pick-up device. In FIG. 17, the pick-up device 160 has no ears, as it does in the previous embodiment. The device 160 includes a pair of legs 161, each having an associated pair of lining notches 162. Again, these notches are for engagement of the pick-up device with the hole in the center of the disc.

Figure 18:
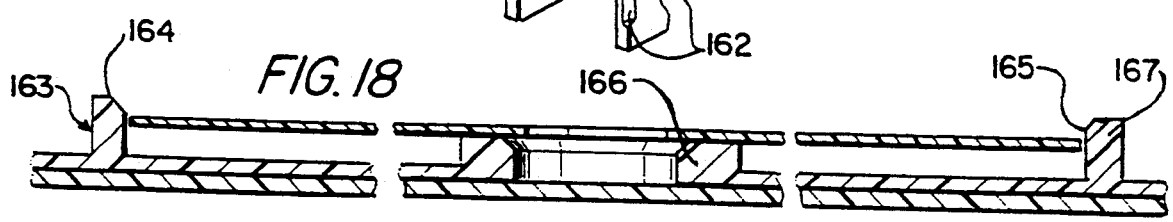
FIG. 18 is a cross-sectional view of another embodiment of the insert in which the media disc rests only on the hub of the insert.

FIG. 18 shows an alternate embodiment of the invention. In this embodiment of the invention, the insert 163 has support ribs 164, with bevelled tops 165. The insert also includes a central hub 166, having an opening therein to enable access to the compact disc by means of the pick-up device. In this embodiment of the invention, the bevels 165 assist in guiding the disc into a supporting position on the insert. For this particular embodiment, the disc is supported at the hub 166. The wall 167 of the support rib prevents side-to-side movement of the disc.

Reference is now made to FIG. 19 for an illustration of a storage box 170. The storage box 170 preferably includes interlocking ribs 171 that would enable the storage box to be stacked with other storage boxes. FIG. 19 shows the storage box containing a series of media storage cases 172. Each of these cases has a thumblift device 173, as illustrated. The thumblift device may be one of a number of different types described herein. Each of the thumblift devices preferably has the numbering tab as illustrated at 174. The thumblift devices are useful in not only assisting in opening of the case when the disc is to be accessed, but also are helpful in enabling one to pull the disc out of the storage box 170. FIG. 19 shows the illustration of numbering on each of the storage cases for easy access and identification.

Reference is now made to FIGS. 20 and 21 for a further embodiment of the present invention. In this embodiment, the storage case is comprised of a base 175 and a cover 176. Within the base 175 there is shown a separate insert 178. The insert is slid into the base and retained in a manner previously described in association with FIG. 6. In this regard, note the guide ribs 179 on the side walls of the base. The insert 178 includes spacedly disposed ribs 180 and a centrally disposed hub 181. Attached to the cover 176 is an improved form of clip 182. The clip 182 is shown in a cross-sectional view in FIG. 21.

In the embodiment of FIGS. 20 and 21, the disc 101 is supported on the hub 181. The clip 182 is a multifunction clip and is provided with a recess for interlocking with the rear wall 184 of the cover 176. This is clearly illustrated in FIG. 21. The clip also includes projections extending in either direction, including a leg 185 and a leg 186. In the closed position of the case, as illustrated in FIG. 21, it is noted that the leg 186 forms a seal, essentially closing the opening 187 provided at the rear of the base of the storage case. Again, refer to FIG. 21. Moreover, the leg 186 has an extension 188, as also noted in FIG. 21, that is adapted to engage the peripheral edge of the disc 101 in the closed position of the case. The leg 185 of the clip 182 is used in the open position of the case, and bears against the bottom wall 190 of the base 175. This is similar to the arrangement illustrated in FIG. 8 by the downwardly depending leg together with the clip 110.

In summary, the clip illustrated in this embodiment of the invention provides multiple functions, including a means for enabling the case to be held in a partially open position, an enclosing seal for the case, and a means for retaining and securing directly the edge of the disc at one side thereof. All of these features are illustrated most completely in FIG. 21.

At the front of the case, as also illustrated in FIGS. 20 and 21, there is provided a retainer 192, which has an interior bevelled wall 193. The wall 193 engages the opposite side of the disc as it relates to the extension 188 of the clip 182. The retainer 192 is secured in the case by means of a double-sided tape 194 that extends over the two surfaces thereof. The retainer 192 is held at the front corner of the cover of the case by means of the tape. The tape also holds the identification strip 195 in place, as illustrated in, for example, FIG. 21.

FIG. 22 shows an alternate embodiment of the retainer. In FIG. 22 the front retainer 197 is of L-shaped construction and also has the double-sided adhesive tape for securing it at the front edge of the cover. The retainer 197 also is used for holding the identification strip, which is viewable through the clear plastic material forming the storage case and in particular the lid thereof.

FIG. 23 shows an alternate construction for the clip. In this particular embodiment, the clip 182 also includes the legs 185 and 186. There is also provided the extension 188 for engagement with the disc. However, in the embodiment of FIG. 23, there is also provided a support rib 199 that provides for more positive interengagement of the clip with the base 175. This provides a good dust seal so that the case is completely enclosed when in its closed position.

Figure 24:
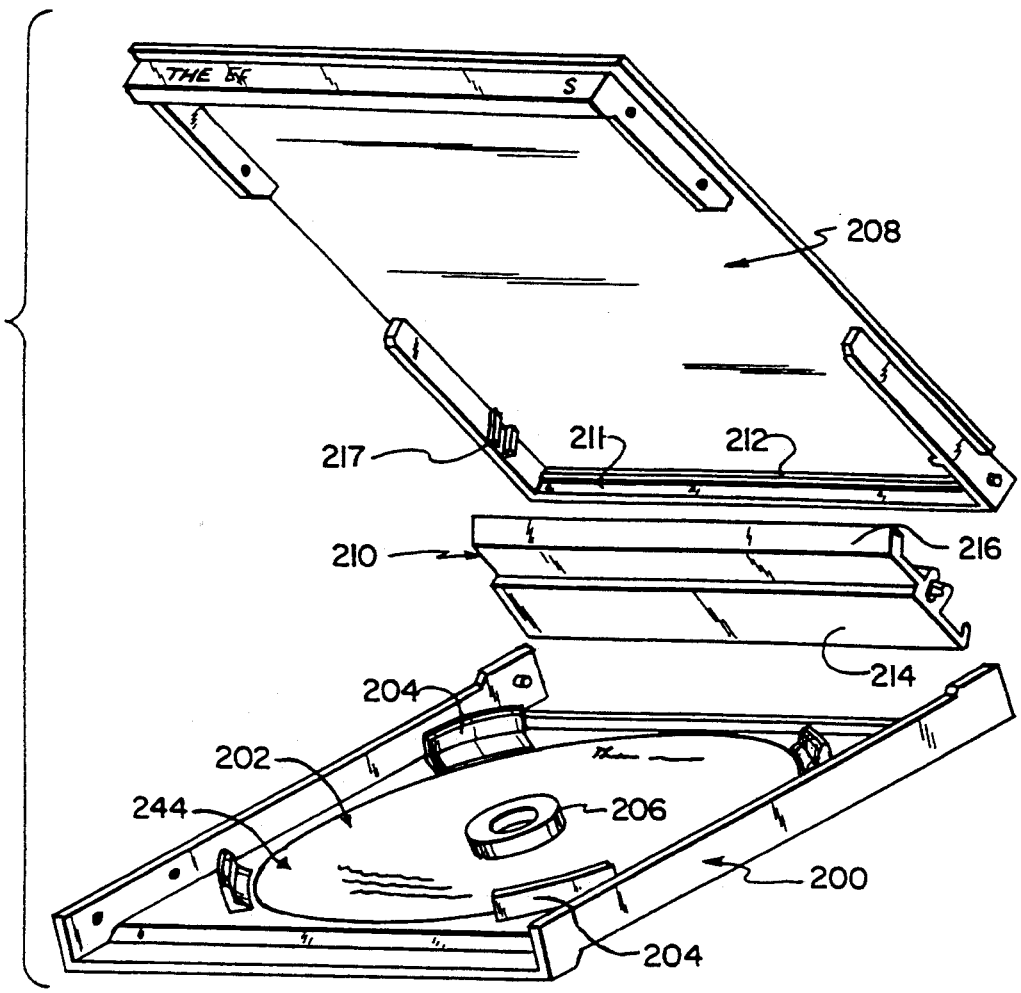
FIG. 24 is an exploded perspective view of still another embodiment of the present invention in which the base of the storage case is of one molded piece.
Figure 25:
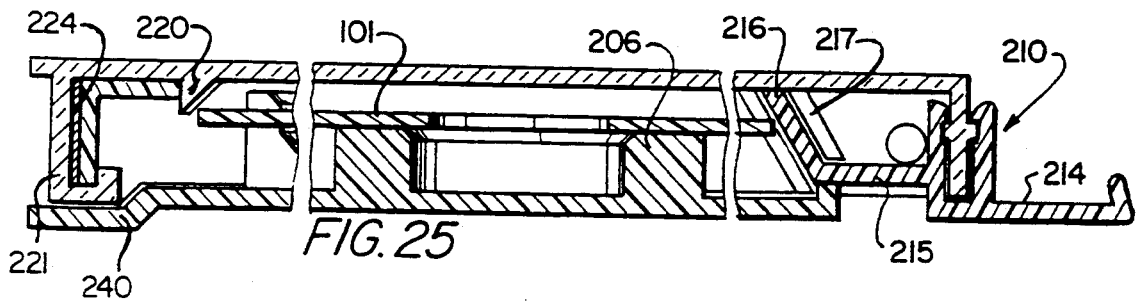
FIG. 25 is a cross-sectional view through the storage case of FIG. 24.
Figure 26:
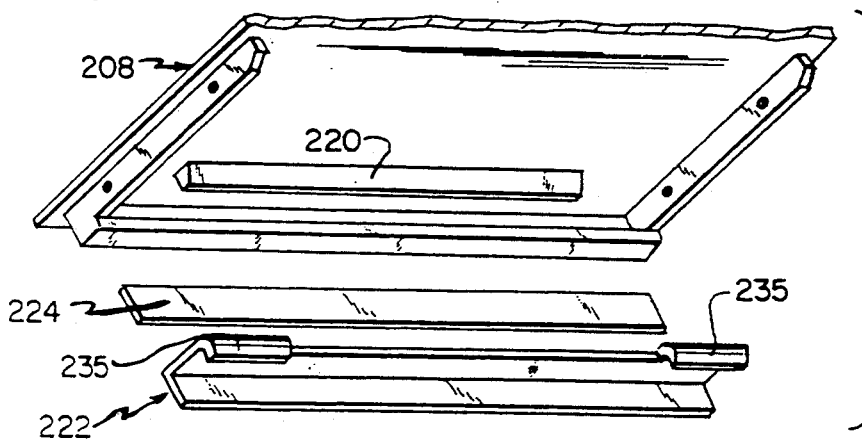
FIG. 26 is a fragmentary exploded perspective view showing the manner in which the front retainer is used with the cover.

Reference is now made to FIGS. 24–26 for a further embodiment of the present invention. In this embodiment, the storage case comprises a base 200 having a molded and integral part 202 constructed therewith. The integral part 202 has the ribs 204 and the center hub 206. The storage case also includes a cover 208 and clip 210. The clip 210 is similar to the clip previously described in association with FIG. 21, but is of somewhat different construction.

As illustrated in the cross-sectional view of FIG. 25, the clip 210 has a recess that is adapted to interlock with the rear wall 211 of the cover 208. The rear wall 211 preferably has oppositely disposed ribs 212, which enable in the interlocking. Refer to FIG. 25, which shows the tongue-in-groove interlock that is provided, the grooves being provided in the recess of the clip 210. The clip 210 also includes legs 214 and 215 extending in opposite directions. The leg 214 is used to engage with the base in the open position of the case. The leg 215 has its angled end 216 engaging with the edge of the disc, as clearly illustrated in FIG. 25. The end 216 of the leg 215 is also preferably secured in oppositely disposed end recesses defined in the side walls of the cover. In this regard, refer to FIGS. 24 and 25, showing the strips 217 forming a recess therebetween. The very ends of the leg 216 can extend into these recesses for further securing the clip in place on the cover.

As illustrated in FIGS. 25 and 26, the cover 208 preferably also has a securing rib 220 that is integral with the cover and spaced from the front wall 221. A front retainer 222 is provided. The retainer 222 is of L-shape construction, and it is adapted to snap into the position illustrated in FIG. 25, holding the identification strip 224 in place. It is furthermore noted that the retaining rib 220 also has the function of engaging with and holding the periphery of the disc at one side thereof. In this regard, refer to FIG. 25.

A final embodiment of the invention is illustrated in FIGS. 27–29. In this embodiment of the invention, many of the parts previously described and identified in FIGS. 24–26 are the same and thus the same reference characters are applied. Accordingly, in the embodiment of FIG. 27, there is a base 200 having an integral part 202. There is also provided the clip 210 and cover 208. The primary difference between these two embodiments is in connection with the front retainer. In FIGS. 27–29, integral with the cover 208 is a retaining rib 230. Also illustrated is a front retainer 232 that is adapted to snap fit to the position illustrated in FIG. 28, at the same time holding the identification strip 224 in place.

In connection with the retainer 222 illustrated in FIG. 26, it is noted that it is provided with end-disposed fingerlifts 235. These are useful in snapping the member back out. In the embodiments illustrated in FIGS. 24–29, it is also noted that the base of the case has a drop front, as illustrated at 240. In these embodiments of the invention, there is furthermore provided indicia hot-stamped, as illustrated at 244 in FIG. 24. This can provide information directly on the base as to the contents of the disc. The cover is preferably transparent so that one can easily read the information hot-stamped at 244 to determine the content of the disc, once the disc is removed.

Reference is now made to FIGS. 30–36 for another embodiment of the present invention. This embodiment describes a storage case comprising a base 250 and a cover 252. The cover is adapted to pivot from the base. For this purpose, hinge pins 253 are employed. These extend from the rear of a cover and engage in slots 254 of the base. Adjacent to these slots there is an opening 255 for accommodating the wall 256 of the cover.

Figure 30:
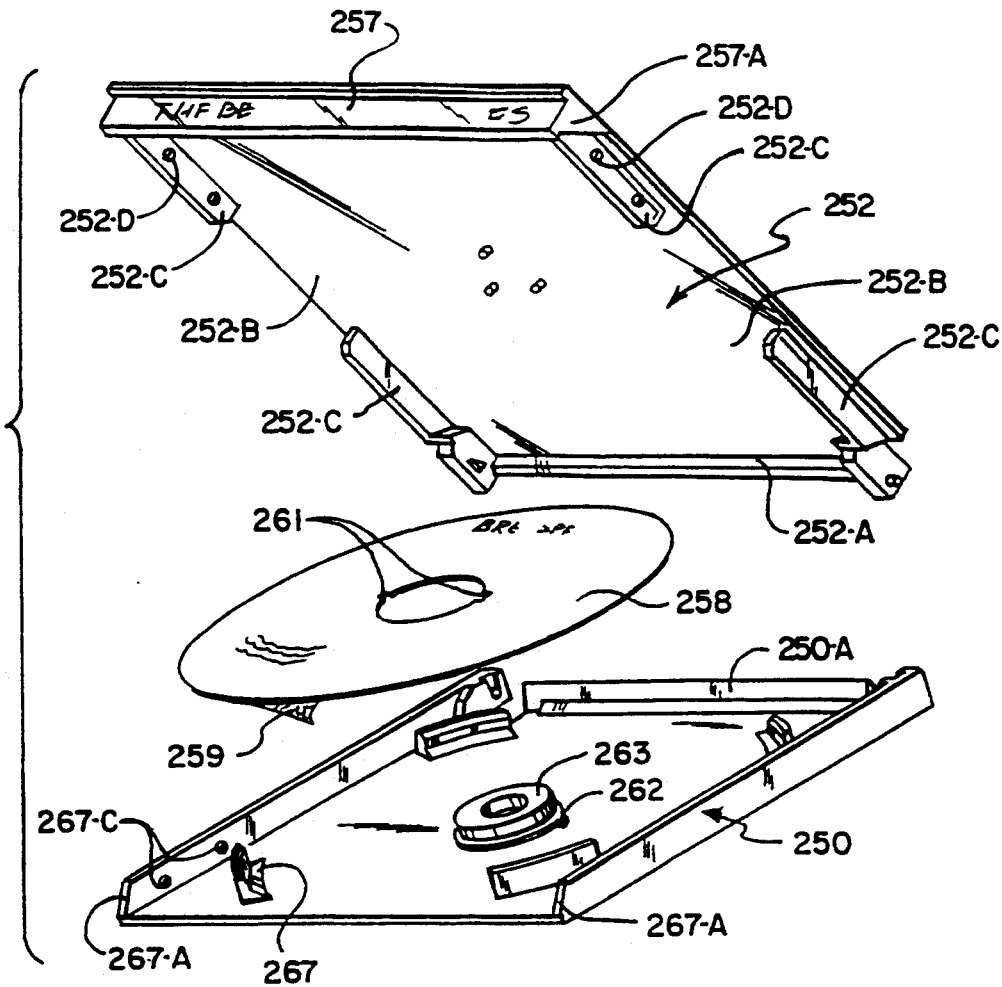
FIG. 30 is an exploded perspective view of an alternate storage case construction including an identification program part.
Figure 31:
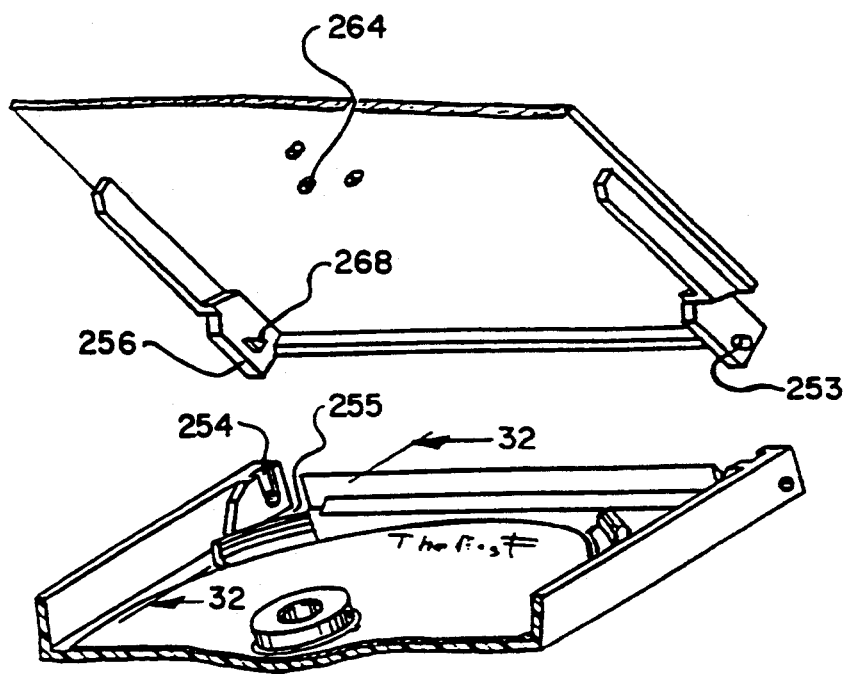
FIG. 31 is a fragmentary perspective view of the embodiment of FIG. 30 showing somewhat further details and illustrating the program part in place in the case.

In FIG. 30, there is also shown indicia 257 behind the front wall of the cover. Positioned within the base is an identification circular program 258. This may be applied by the consumer. The bottom of the program 258 has a peel-off layer 259 that exposes an adhesive. FIG. 31 shows this identification program in place on the base adhesively attached. The program 258 preferably has locating grooves 261 as noted in FIG. 30 for proper registration with tabs 262 or the like extending from the center hub 263 of the base 250.

Figure 50:
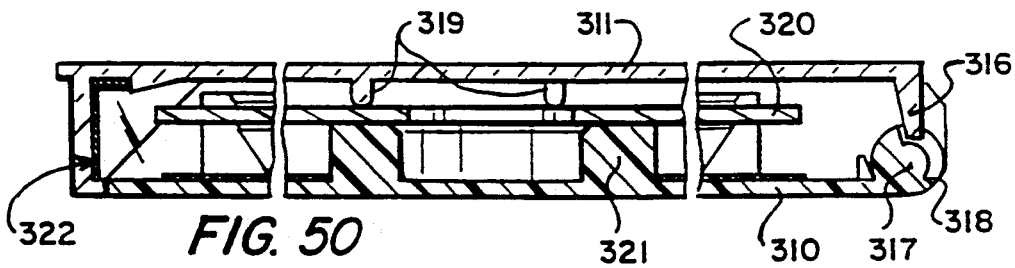
FIG. 50 is a cross-sectional view taken along line 50—50 of FIG. 49.

In another feature of the present invention illustrated in FIGS. 30 and 31 include the plurality of parts 264 that extend downwardly from the inner surface of cover 252. As will be described in further detail hereinafter, these parts 264 are used to apply a slight pressure to the top surface of the compact disc or the like that is supported within the base for proper positioning of this storage medium disc. It is also noted that the embodiment illustrated in FIGS. 30 and 31 has a plurality of retaining members 267 that are used to keep the disc from coming in contact with the base and also for restricting side-to-side movement of the disc. The disc is supported at the center hub 263. Refer, for example, to FIG. 50 herein.

Figure 36:
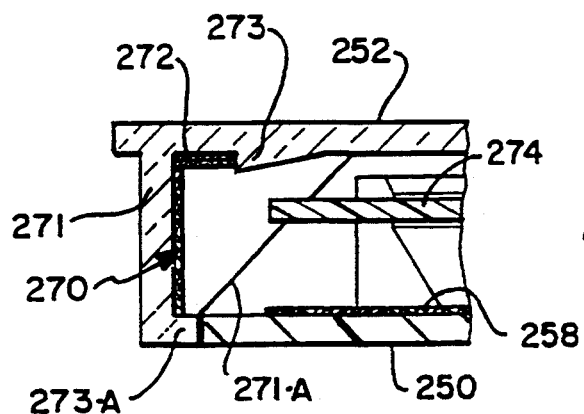
FIG. 36 is a fragmentary cross-sectional view of a portion of the cover of FIG. 35.

In a still further feature of the present invention illustrated in FIG. 30 located in cover 252, there are angular side wall members 257-A which rest against base 250 angular side wall members, located at 267-A while the storage case remains in the closed position shown further in FIG. 36, at 271-A.

Figure 32:
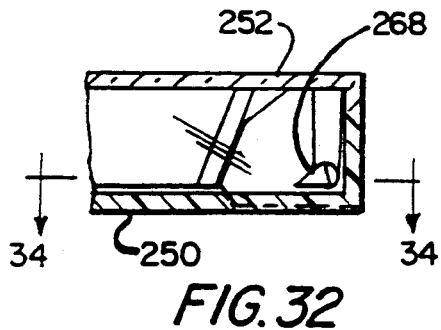
FIG. 32 is a cross-sectional view taken along line 32—32 of FIG. 31.

Further features of the present invention include two rear walls, 252-A of cover 252, and 250--A, of base 250 also found in FIG. 30, illustrating the forming of a full rear wall while storage case remains in the closed position, more further shown in FIG. 32.

A still further feature of the present invention is to provide a space 252-B in cover 252 for the storage disc, between the side walls 252-C permitting the disc not to come in contact with the side walls while the storage case remains in the closed position. Also, the forward pair of side walls 252-C are each provided with a pair of holes 252-D configured to engage a corresponding pair of prongs 267-C while the storage case is in its closed position.

Figure 33:
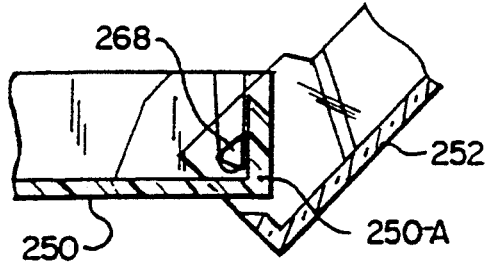
FIG. 33 is a fragmentary cross-sectional view similar to the view of FIG. 32 but with the case in its open position.
Figure 34:
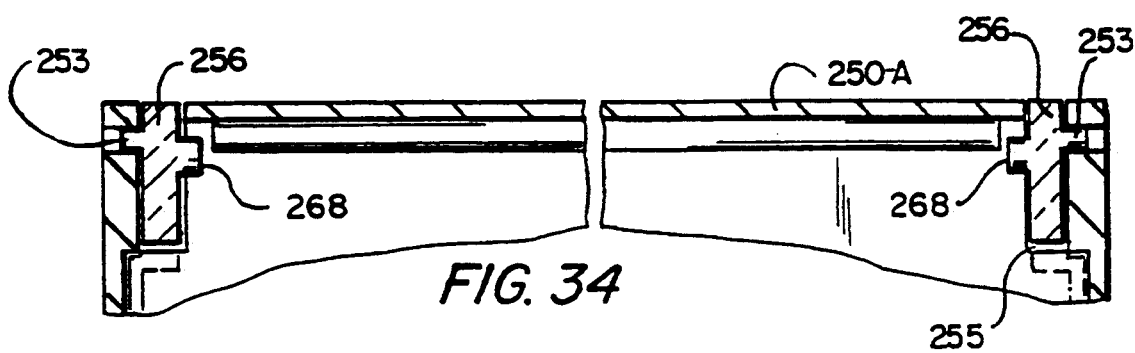
FIG. 34 is a cross-sectional view taken along line 34—34 of FIG. 32.

As illustrated in FIGS. 32-34, associated with the cover wall 256, there is also provided a stop member 268. The member 268 is disposed on the inner side of the wall 256 as illustrated in FIG. 31. FIG. 32 illustrates the case in its closed position. FIG. 33 illustrates the case opened with the cover 252 limited in its rearward position by virtue of the stop member 268 engaging the rear wall 250-A. Also refer to FIG. 34.

Figure 35:
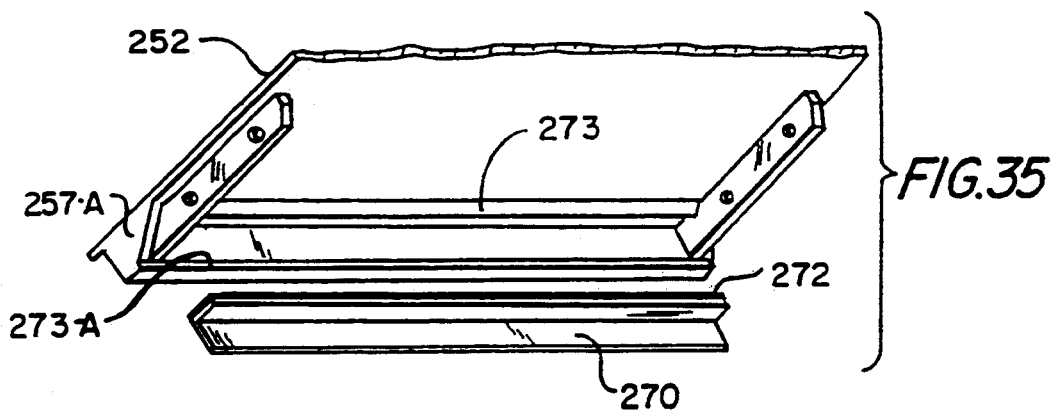
FIG. 35 is a fragmentary view of an alternate embodiment of the storage case cover.

FIG. 35 illustrates a fragmentary portion of the cover 252 and having associated therewith the angle identification card 270. FIG. 36 is a fragmentary cross-sectional view showing the card 270 in place at the front wall 271 of the cover. Incidentally, the cover 252 in all of FIGS. 30-36 is clear and transparent and, thus, one can view through the cover such as to see indicia on the card 270.

The card 270 has on its top end an adhesive layer 272. For securing the card 270 in place, the cover 252 has a shoulder or ledge 273 and 273-A. The card 270 has one leg thereof against the wall 271 while it rests on ledge 273-A and the top leg with the adhesive applied thereto extending between the wall 271 and the shoulder 273. FIG. 36 also shows the edge of a storage disc 274. FIG. 36 also illustrates the program identification part 258. Ledge 273-A furthermore serve to aid in opening the storage case.

Figure 37:
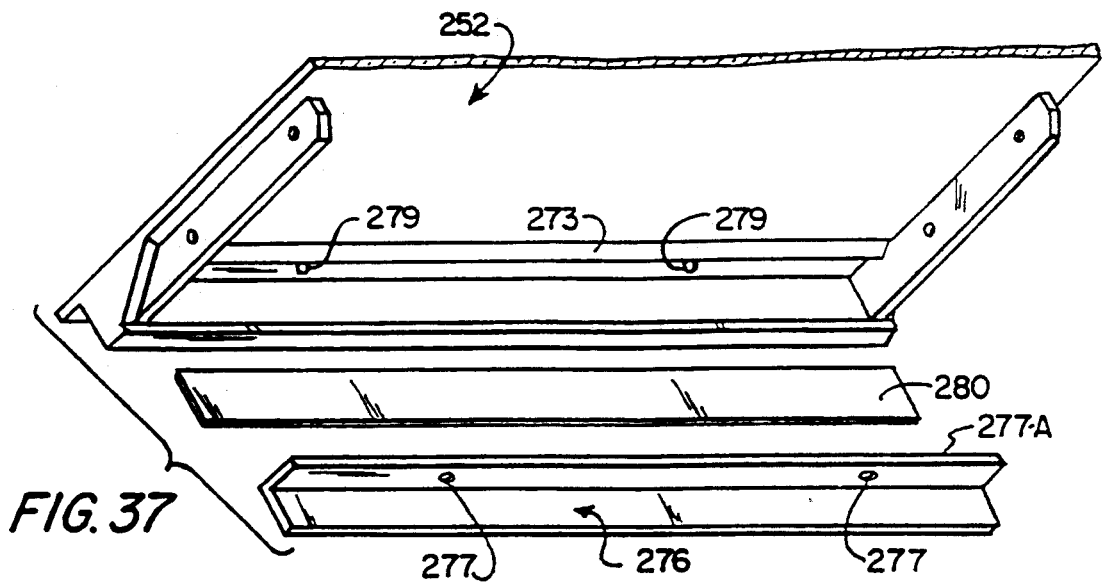
FIG. 37 is a fragmentary perspective view of another embodiment of the storage case cover.
Figure 38:
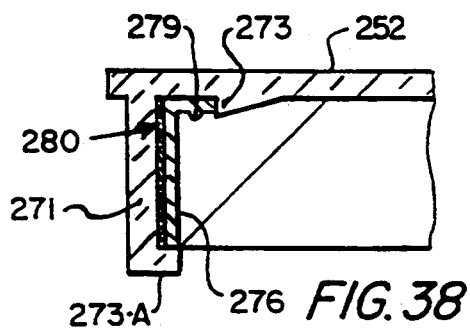
FIG. 38 is a cross-sectional view of the embodiment of FIG. 37.

FIG. 37 shows another embodiment of the present invention employing an angled plastic support piece 276 having a pair of holes 277 therein. These holes 277, as illustrated in FIG. 38, are adapted to receive a corresponding pair of pins 279 extending from the cover 252. In front of the support member 276, there is provided an identification piece 280 which is made of, for example, card stock. The top of the support member 277-A provides a place for a logo.

Figure 40:
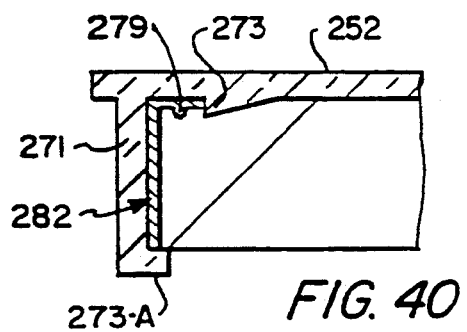
FIG. 40 is a fragmentary cross-sectional view employing the identification angle card of FIG. 39.
Figure 39:
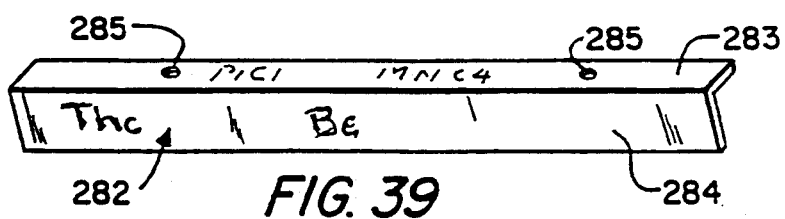
FIG. 39 illustrates another form of identification angle card.

Reference is now made to FIGS. 39 and 40. This shows a slightly different embodiment of the invention in which there is provided an angled card stock member 282. This may have a place on the top leg 283 for a logo. The name of the disc may appear on the front leg 284. FIG. 40 shows this angled card stock in place in the storage case cover. Again, the angled piece 282 is provided with holes 285 that engage with the pins 279 extending from the cover.

Figure 41:
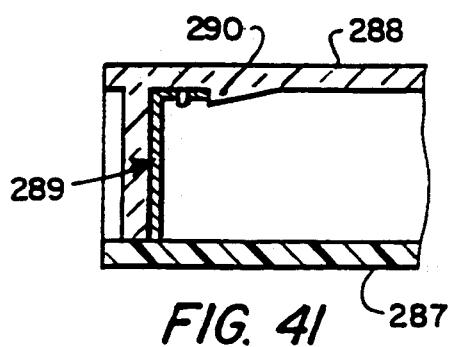
FIG. 41 is a fragmentary cross-sectional view of another embodiment of the invention.

FIG. 41 is a fragmentary view of an alternate case construction, including a base 287 and a cover 288, having a ledge 290. FIG. 41 also illustrates the identification 289 of a form as illustrated in FIG. 39.

Figure 42:
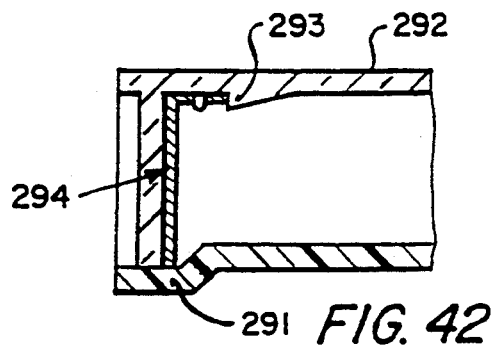
FIG. 42 is a fragmentary cross-sectional view of still another embodiment of the present invention.

FIG. 42 shows an alternate case construction including a stepped base 291 and a cover 292 having a ledge 293. An identification 294 is employed of the type illustrated in FIG. 39. In the embodiments of FIGS. 41 and 42, it is noted that the cover is transparent and, thus, the respective identification 289 and 294 can easily be read through the front wall.

FIGS. 43 and 44 illustrate case construction similar to those shown previously in respective FIGS. 41 and 42.

Referring to FIG. 44A. This drawing illustrates an angle card stock identification 294 that has a peel-off layer 295 exposing an adhesive. This type of form is illustrated in place in the various embodiments of, for instance, FIGS. 43 and 44. This angled peel-off label 294 may be applied by the consumer.

FIG. 45 is a fragmentary cross-sectional view of another embodiment of the invention including a cover 296 and a stepped base 297. The cover 296 has a front wall 298. An angle identification 299 is supported adjacent to the front wall 298 in the position illustrated in FIG. 45. The identification 299 may be of the type illustrated in FIG. 44A.

Reference is now made to FIG. 46 illustrating a fragmentary portion of a media storage case cover 300. The front wall 301 is provided with hot stamping as illustrated at 302 on the inner surface thereof.

FIG. 47 illustrates a base 303 and a cover 304. The front wall 305 of a cover has mounted there behind a plastic angle member 306. On the top leg of the member 306 there is an adhesive layer 307. On the other leg of the member 306, there is a sticky back identification card 308. This can be viewed through the transparent wall 305.

The embodiment of FIG. 48 also employs an angled support member 306. The has sticky surfaces on both legs and also supports an identification card 309 against the adhesive on one of the legs of the support member 306.

Reference is now made to a further embodiment of the present invention illustrated in FIGS. 49-55. This embodiment of the storage case is comprised of a base 310 and a cover 311. This particular embodiment of the invention has an improved hinge construction including a pair of hinge pins 312 in the base. These interengage with slots 313 in the cover. At the center section of the cover there is also provided hinge pins 314 and associated slots 315 on the base. The cover 311 also has a stop member 316 at its center section. FIG. 50 shows the wall 316 engaging with the rear piece 317. When the cover is opened, the wall 316 functions as a stop against the end wall 318 defined in the piece 317.

A combination of the pivot pins 312 and the slot 313 provide the basic hinging arrangement. The other pins 314 simply rest in the slots 315.

Figure 49:
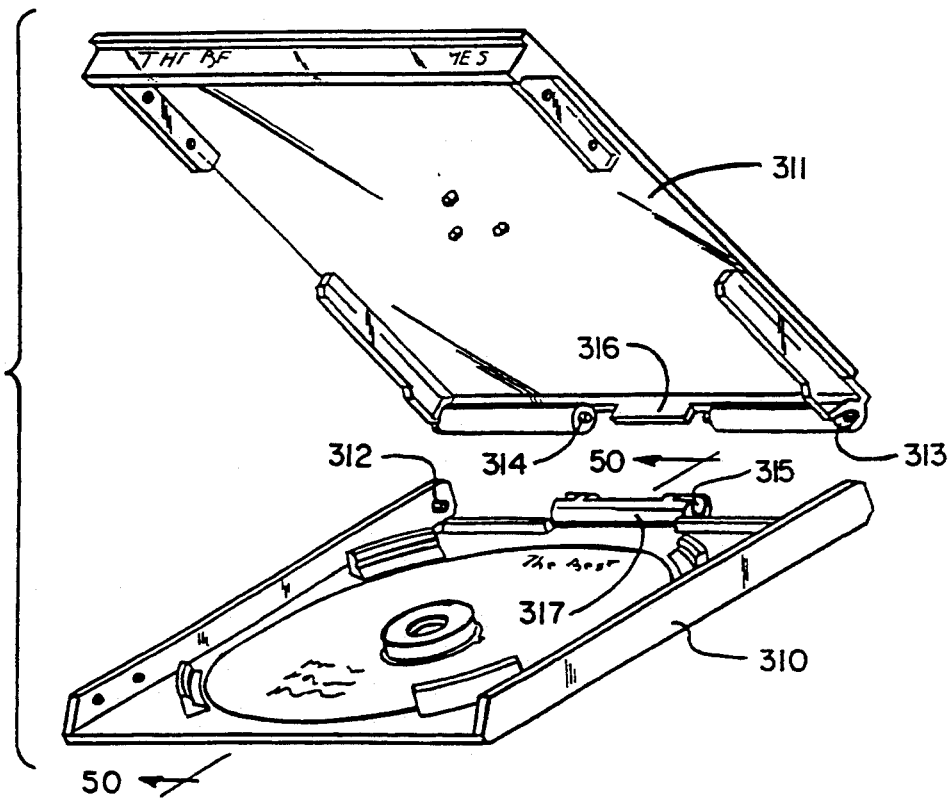
FIG. 49 shows a storage case with cover and base for an alternate embodiment of the invention.

FIGS. 49 and 50 also illustrate the parts 319 extending downwardly from the case cover 311. It is noted that these engage the compact disc 320 and maintain it in position but with a relatively light pressure being applied thereby. It is noted that these parts basically over lie the center hub 321 of the case base 310.

Figure 51:
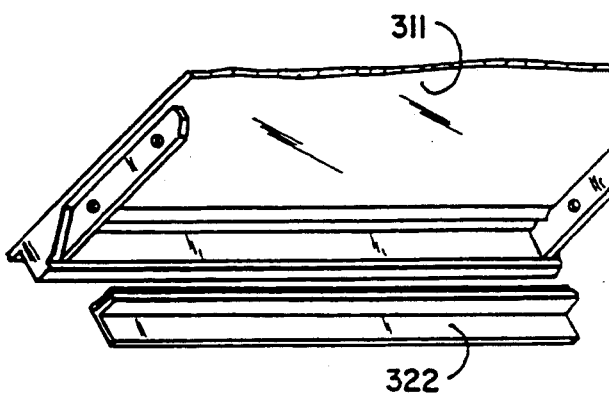
FIG. 51 is a fragmentary perspective view of the cover.
Figure 52:
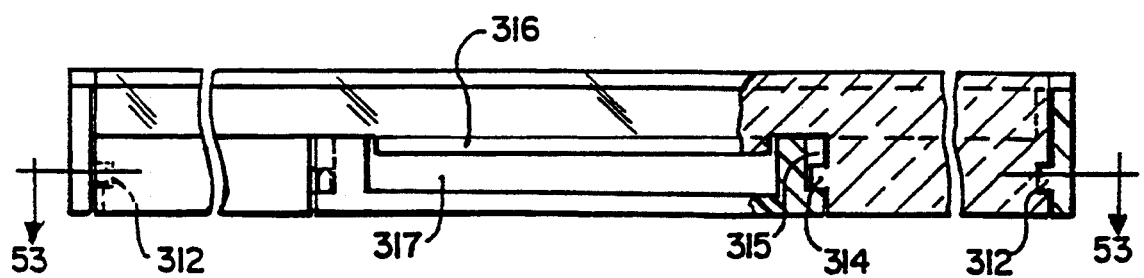
FIG. 52 is a rear view of the embodiment of the invention illustrated in FIG. 49.

Reference is also now made to FIG. 51 showing a card stock identification 322. FIG. 50 shows the identification 322 in place in the transparent cover. This would have some type of indicia on the front face so that one could read information about the content of the case such as the name of the storage disc or the like.

Figure 53:
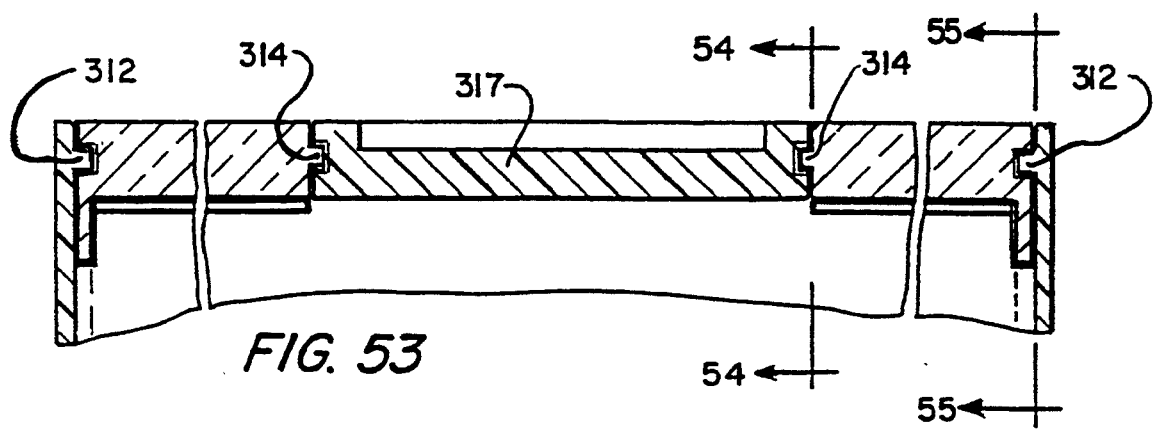
FIG. 53 is a cross-sectional view taken along line 53—53 of FIG. 52.
Figure 54:
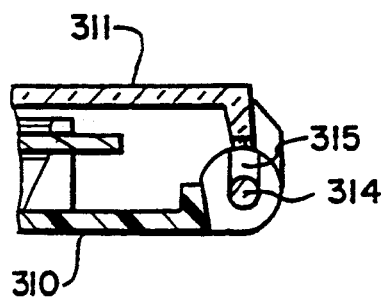
FIG. 54 is a cross-sectional view taken along line 54—54 of FIG. 53.
Figure 55:
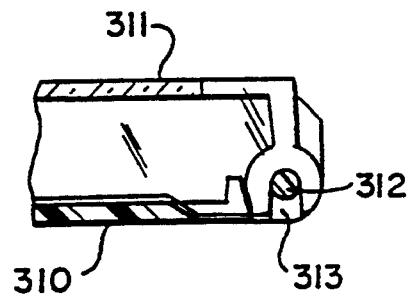
FIG. 55 is a cross-sectional view taken along line 55—55 of FIG. 53.
Figure 56:
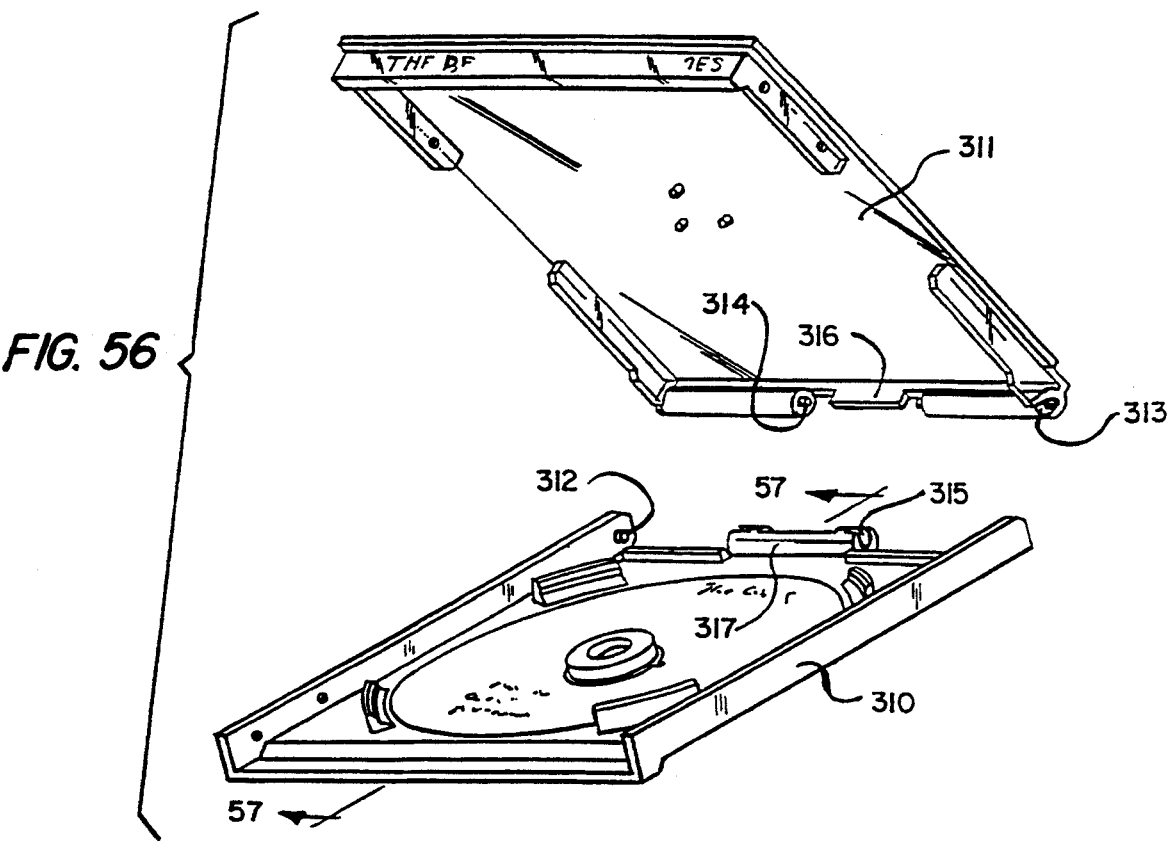
FIG. 56 is a perspective view of another embodiment of the present invention.
Figure 57:
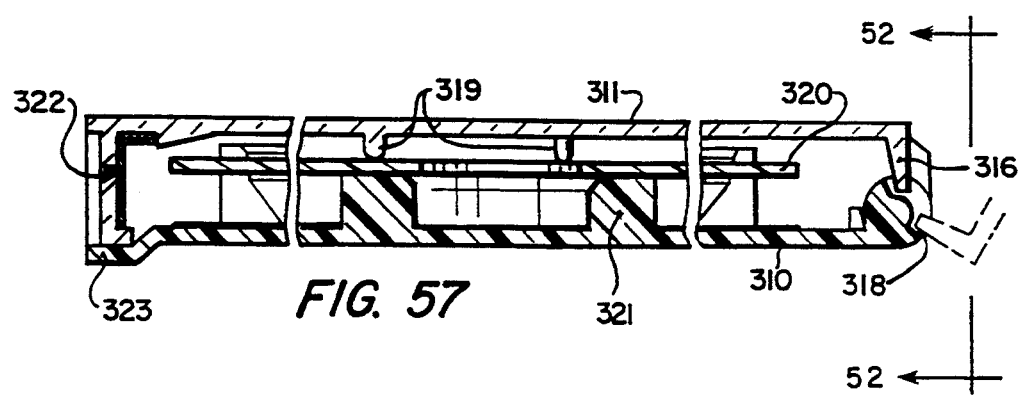
FIG. 57 is a cross-sectional view taken along line 57—57 of FIG. 56.

Reference is now made to FIGS. 52-55. These drawings show further illustrations, in particular, of the hinging arrangement of the embodiment of FIG. 49. FIG. 54 shows the manner in which the pins 314 simply rest in the respective slots 315. FIG. 55 shows the manner in which the pins 312 actually snap interlock in the slots 313. Also, FIG. 53 illustrates the open cut out on each side of the base so as to accommodate the hinge construction and, in particular, side walls associated with the cover.

Reference is now made to FIGS. 56–60. This shows another embodiment of the present invention that is quite similar to the embodiment illustrated in FIG. 49. The primary difference in these embodiments is that the embodiment of FIG. 56 has a stepped front as illustrated at 323 in FIG. 57.

Figure 58:
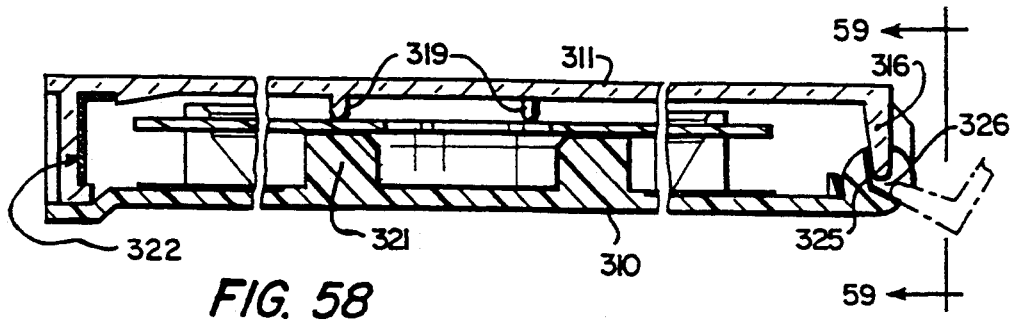
FIG. 58 is a cross-sectional view similar to that of FIG. 57 for an alternate hinge construction.
Figure 59:
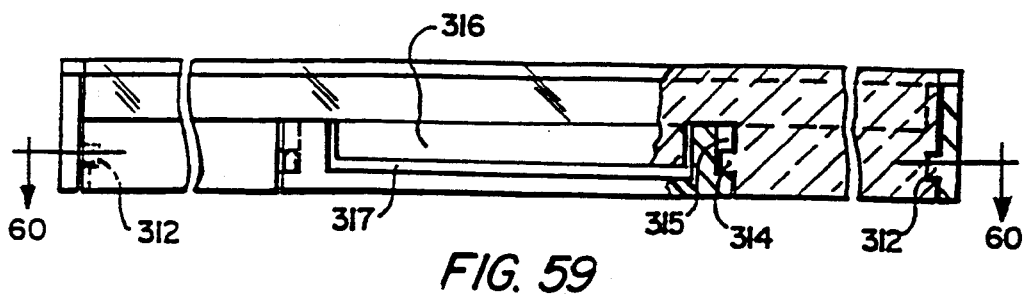
FIG. 59 is a rear view of FIG. 58.
Figure 60:
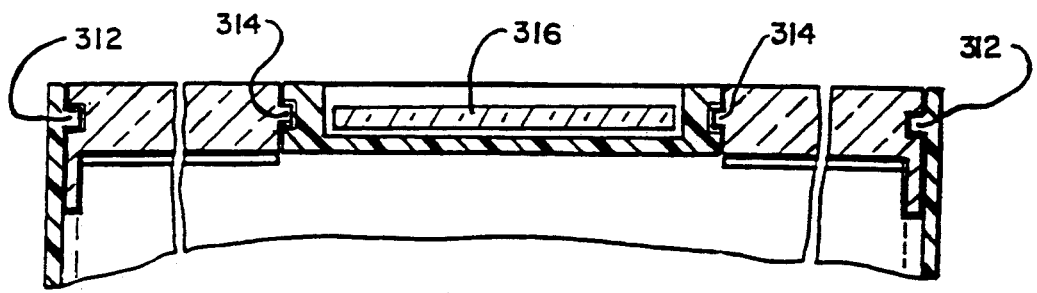
FIG. 60 is a fragmentary cross-sectional view taken along line 60—60 of FIG. 59.

Furthermore, FIG. 58 illustrates a somewhat different embodiment for the barrel hinge. In this embodiment, it is noted that the opening in the barrel 325 is more open. In this regard, refer to the more open 326 in FIG. 58. FIG. 58 also shows the case in its closed position. Furthermore, FIG. 58 illustrates by dotted outline the position of the cover when the case is opened. It is noted that the stop piece 316 is adjacent to an end wall in the hinge barrel 325.

Figure 61:
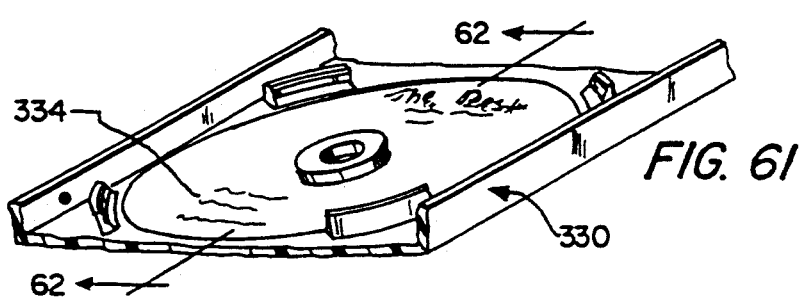
FIG. 61 is a fragmentary view of a storage case base.
Figure 62:
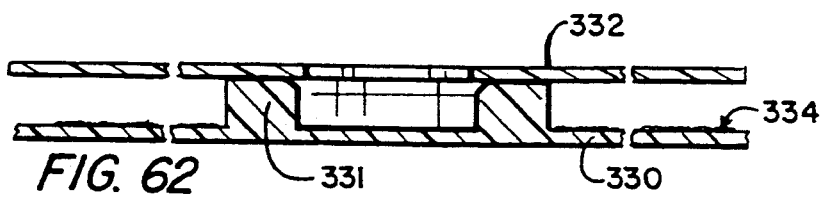
FIG. 62 is a cross-sectional view taken along line 62—62 of FIG. 61.

Reference is now made to FIGS. 61 and 62 for a further embodiment of the invention. FIGS. 61 and 62 illustrate a base 330 having a center support 331 for the media disc 332. Hot stamping is provided at the surface of the base. This is illustrated at 334 in FIGS. 61 and 62. This hot stamping may indicate the contents of the disc. When the disc is removed, the case has a transparent cover so that the indicia hot stamp can readily be read.

Figure 63:
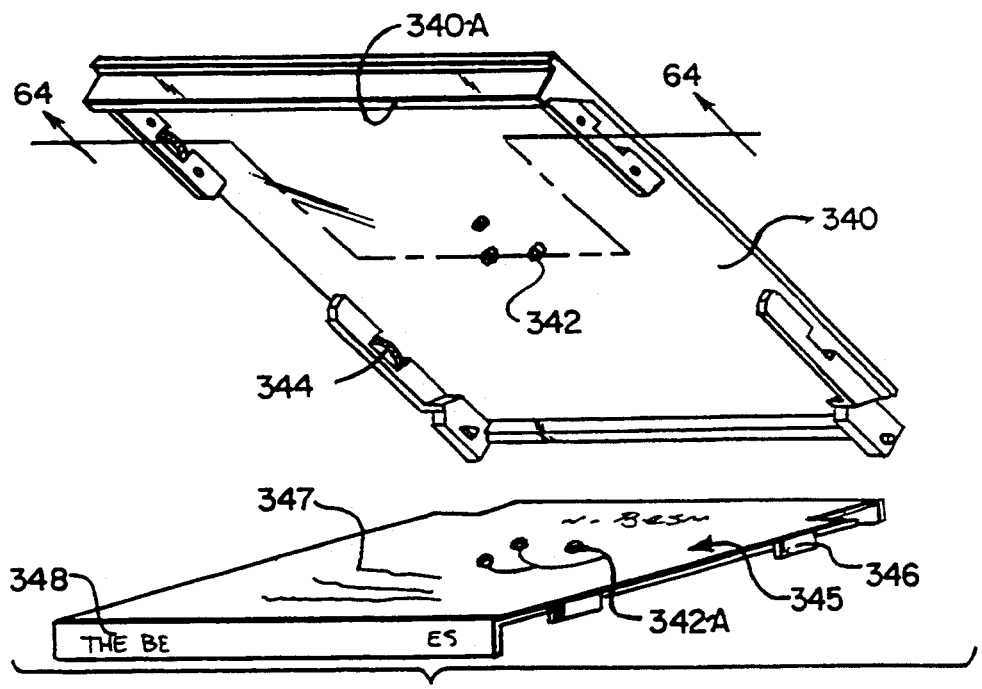
FIG. 63 is a perspective view of an alternate embodiment of the invention including a cover identification indicia card.
Figure 64:
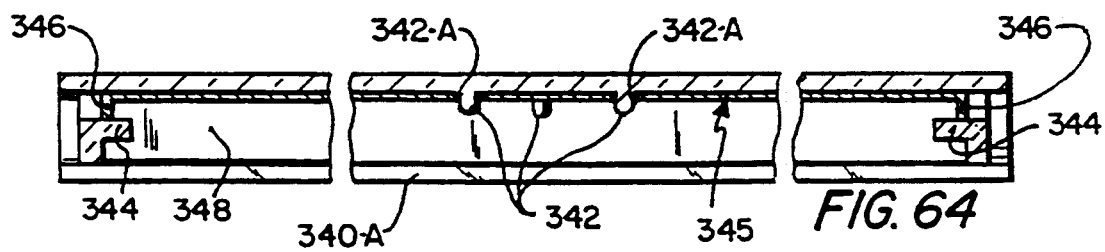
FIG. 64 is a cross-sectional view taken along line 64—64 of FIG. 63.

Reference is now made to FIGS. 63 and 64 for a further embodiment of the present invention. FIG. 63 illustrates a cover 340. This cover may be used with a base cover type previously described in earlier embodiments. This particular cover 340 is provided with the aforementioned parts 342. Also, on side walls, there are provided four securing ledges 344. These ledges are for receiving the indicia insert 345. It is noted that the indicia card 345 has angled retaining members 346 for engaging the ledges 344. The card 345 also has a top surface 347 upon which indicia is found. The card 345 also has a front panel 348 which rests on member 340-A of cover 340. The name of the disc would be viewable through the front transparent wall of a cover.

FIG. 64 is a cross-sectional view illustrating the assembled card in the cover. It is noted that the card has holes 342-A for accommodating the parts 342.

Figure 65:
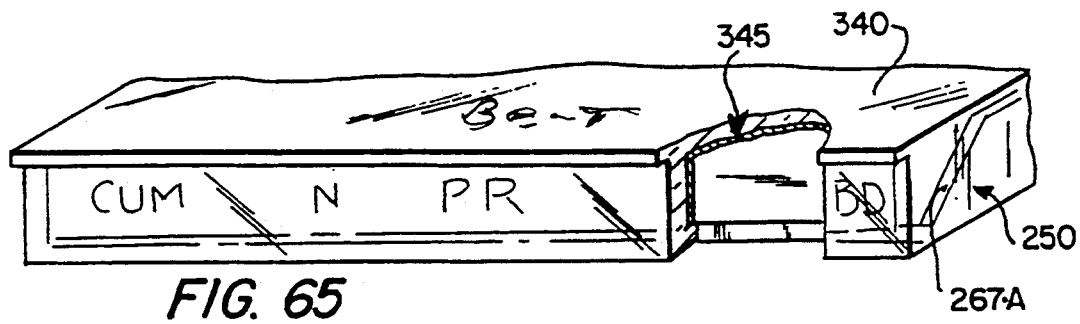
FIG. 65 is a perspective view partially cut away of the embodiment of FIG. 63.

FIG. 65 illustrates the storage case including an alternate cover 340 and the base 250. FIG. 65 illustrates the card 345 in position within the cover, and still further illustrates the angular side walls 267-A of base 250, FIG. 30.

Figure 66:
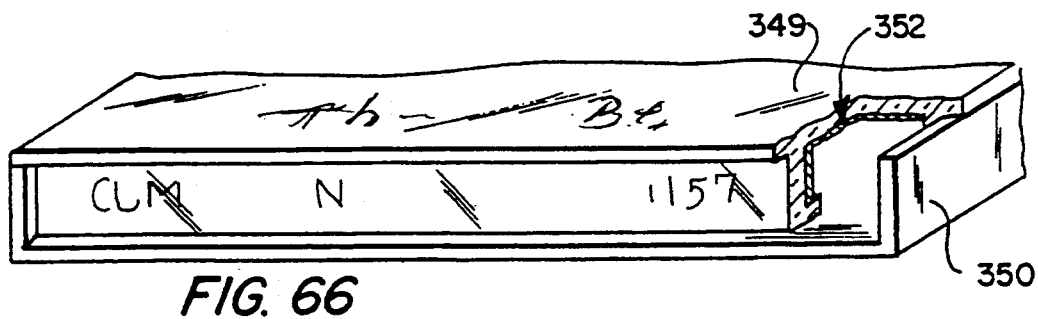
FIG. 66 is a perspective view partially cut away of an alternate embodiment.

FIG. 66 shows a slightly different arrangement including a cover 349 and a base 350. Again, a similar card 352 may be employed inside of the cover. This may be in the form similar to that illustrated in FIG. 63.

Figure 67:
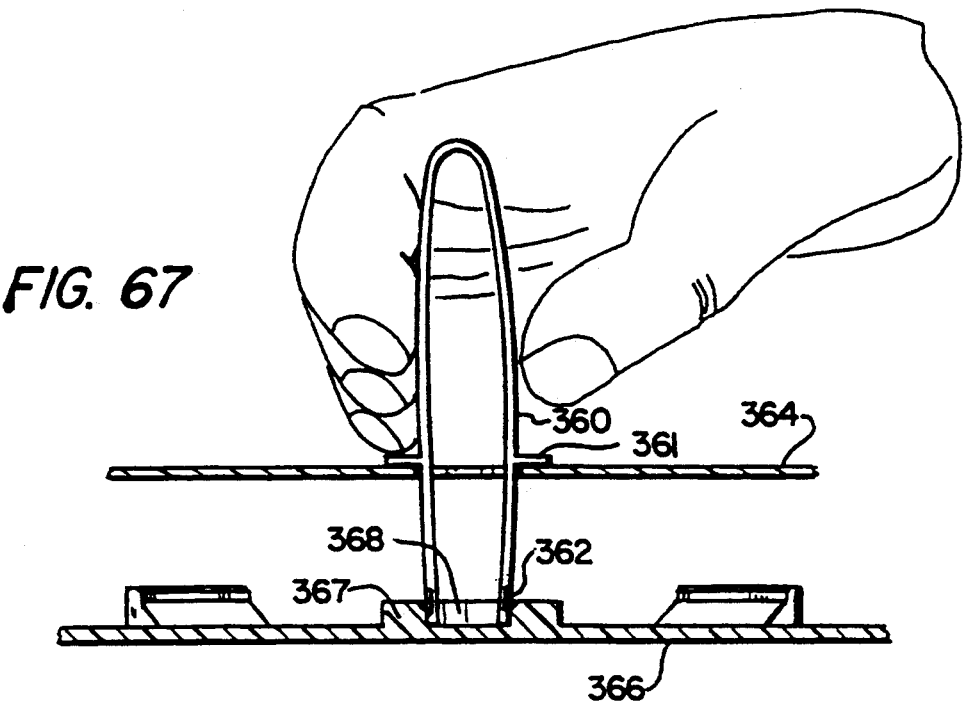
FIG. 67 shows the use of a pick-up device.
Figure 68:
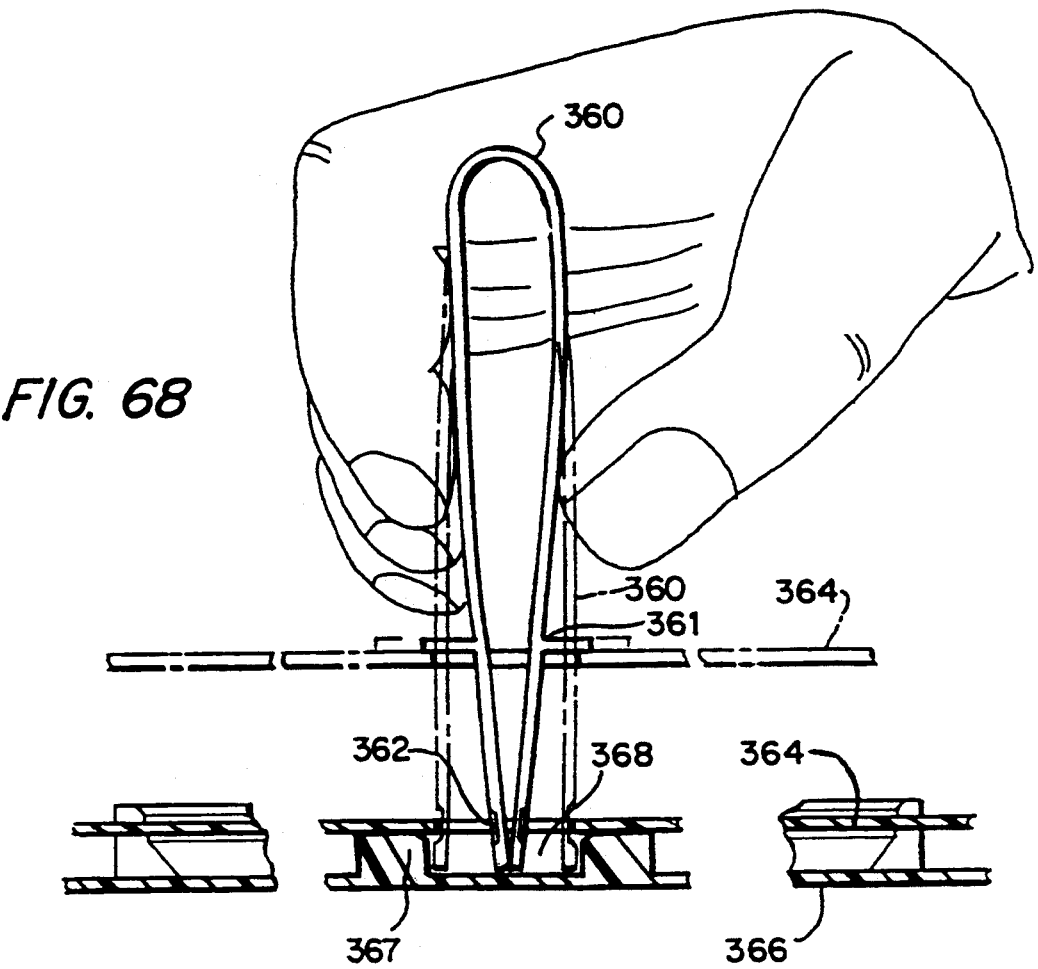
FIG. 68 is a further view showing the operation of a pick-up device.

Reference is now made to FIGS. 67 and 68 herein. These figures illustrate a pick-up device 360 generally of the type previously described in FIGS. 8 and 9. The pick-up device 360 has flanges 361 as well as bottom recesses 362. FIG. 67 shows the pick-up device 360 being used for disposing the storage disc 364 in the base 366. It is noted that the base 366 has a central support hub 367 with a centrally disposed hole 368 therein. As illustrated in FIG. 67, the ends of the pick-up device 360 are accommodated in the hole 368. The hole 368 essentially forms a guide for the pick-up device so that the disc 364 is properly positioned in the base.

FIG. 68 shows how the pick-up device is used for dropping the disc down to the base hub 367.

Figure 69:
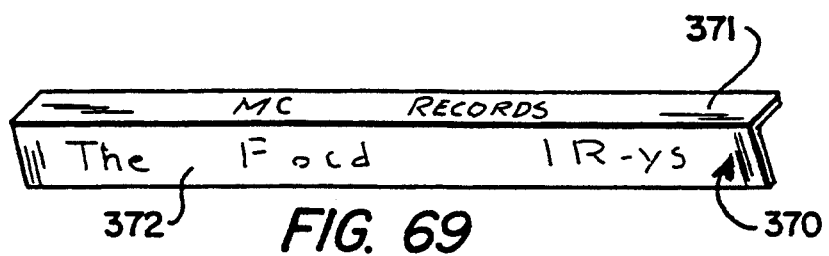
FIG. 69 shows another angle identification card stock.

FIG. 69 illustrates another form of an identification card. This is in the form of an angled card 370. This may have one leg 371 upon which a logo is disposed. The other leg 372 usually carries the identification for the disc.

Figure 70:
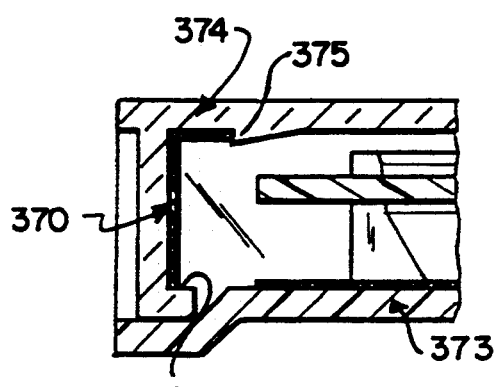
FIG. 70 is a fragmentary cross-sectional view using the card stock of FIG. 69.
Figure 71:
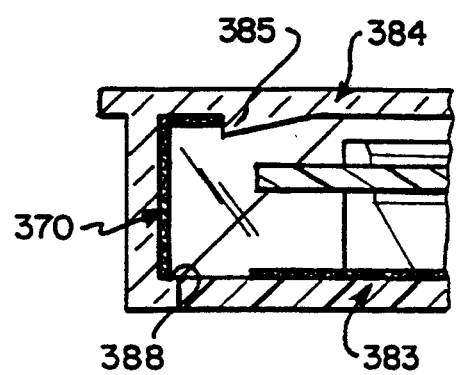
FIG. 71 is a further embodiment in a fragmentary cross-sectional view; using the card stock of FIG. 69

FIGS. 70 and 71 show fragmentary cross-sectional views of alternate embodiments. FIG. 70 shows a base 373 and a cover 374 having a ledge 375. The card 370 is illustrated essentially wedged in between the ledge 375 and a bottom surface 378 associated with the cover.

In a similar manner, FIG. 71 shows the base 383 and the cover 384 with its associated ledge 385. Again, the angled card 370 is shown wedged between the ledge 385 and the surface 388 at the bottom of the front part of the cover. In these particular embodiments, it is noted that no adhesive is employed.

Figure 72:
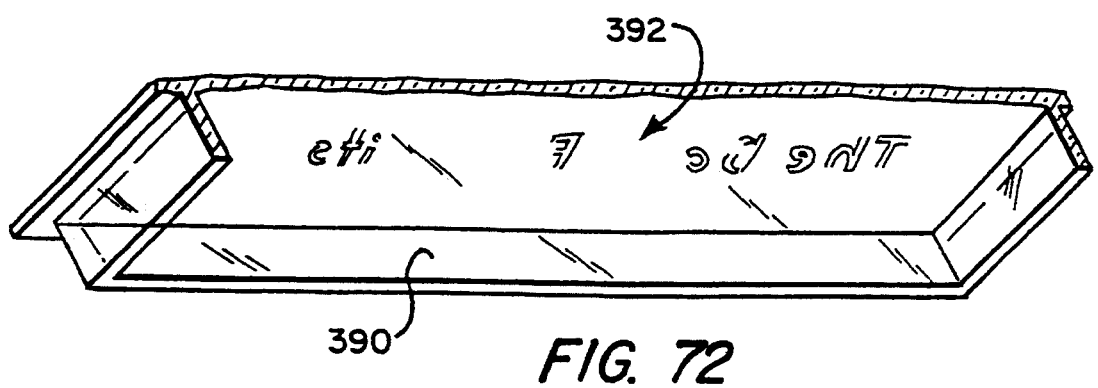
FIG. 72 illustrates hot stamping in the case cover.

FIG. 72 shows still a further embodiment of the present invention showing a portion of a cover 390. The cover is hot stamped on the inner surface as illustrated at 392.

Having now described a limited number of embodiments of the present invention it should now be apparent to those skilled in the art that numerous other embodiments and modifications thereof are contemplated as falling within the scope of the present invention as defined by the appended claims.

What is claimed is:

1. A storage case for a disc-type media comprising a base and cover and means securing the base and cover together but permitting opening and closing thereof, said cover having a shoulder defining an opening for receiving an angled identification card, said card comprising first and second adjacent portions disposed substantially at a right angle to each other, said card being located in and held in said opening in such a manner that an edge of said first portion of the card abuts said shoulder and the card and cover are juxtaposed.

2. A storage case as set forth in claim 1 wherein said cover also has a ledge upon which the angled identification card rests at an edge of said second portion.

3. A storage case for a disc-type media comprising a base and cover and means securing the base and cover together but permitting opening and closing thereof, said cover including a front wall having a ledge shoulder defining an opening for receiving an identification and an identification securing part.

4. A storage case for a disc-type media comprising a non-transparent base and a transparent cover and means securing said base and said cover together but permitting opening and closing thereof, and program identification means adapted to be secured in said base, said program identification means legend facing in an upward direction so as to be viewable through the said transparent cover after the disc-type media has been removed from the storage case, said program identification means utilized for identifying one or more programs on the media, said program identification means and said base being mutually juxtaposed.

5. A storage case as set forth in claim 4 wherein the program identification means has a sticky backing.

6. A storage case as set forth in claim 4 including registration means for aligning the program identification means at a predetermined position in the base.

7. A storage case as set forth in claim 4 wherein said base has registration means for alignment of said program identification means on said base.

8. A storage case for a disc-type media comprising a base and a cover and means securing said base and said cover together but permitting opening and closing thereof, wherein said cover is transparent, wherein said base has a bottom wall with indicia thereon and viewable through said transparent cover when the media disc is removed.

9. A storage case for a disc-type media comprising a base and a cover and means securing said base and said cover together toward the rear of said base and said cover but permitting opening and closing thereof, said base having angular portions which aid in forming a seal for said storage case between said base and said cover while said case is in the closed position said base angular portions each sloping upwards from the front towards the rear of said base, said cover having corresponding angular portions mating with but sloped oppositely of said base angular portions.

10. A storage case for a disc-type media comprising a base and cover and means securing said base and said cover together but permitting opening and closing thereof, said base having a centrally located raised surface upon which the stored media rests while maintaining the media a distance above the base, said centrally located raised surfacr being absent of any retaining means restricting the stored media from side movement, said base further including retaining means between which the stored media rests, said retaining means restricting side movement of the store media away from said centrally located raised surface upon which the media rests, said base being configured to not interfere with said retaining means, said base further including open rearward sections on either side thereof to receive a part of the cover that is connected to said securing means which permits opening and closing of said storage case, said open rearward sections located inside of base side walls and having a portion of the base on both sides of the said open sections, said base further including a section for engaging a portion of said cover of said storage case so as to limit the rearward position of said cover while said case is in the open position thereof, said cover including centrally located means on the inner surface side thereof which serves to hold the stored media in place between the said centrally located raised surface in said base upon which the stored media rests and the said centrally located means in the cover, said centrally located cover means keeping the stored media a distance below the said inner surface side of the cover while said storage case is in the closed position thereof, and said cover further including means which correspond with means of said base in securing the front section of said cover closed.

11. A storage case for a disc-type media as set forth in claim 10 further including extended means on the front section of said cover which serves to aid in opening said storage case.

12. A storage case for a disc-type media comprising a base and a cover and means securing the base and cover together but permitting opening and closing thereof, said base having a centrally located raised surface upon which the stored disc rests while maintaining the media a distance above the base, said centrally located raised surface being absent of any retaining means restricting the stored media from side movement, said base further including retaining means between which the stored media rests, said retaining means restricting side movement of the stored media away from the said centrally located surface upon which the media rests, said base being configured to not interfere with said retaining means, said base further including a section for engaging a portion of said cover of said storage case so as to limit the rearward position of the cover while said case is in the open position thereof, said cover including centrally located means on the inner surface side thereof which serves to hold the stored media in place between the said centrally located surface in said base upon which the stored media rests and the said centrally located means in the cover, said centrally located cover means keeping the stored media a distance below the said inner surface side of the cover while said storage case is in the closed position thereof, and said cover further including means which correspond with means of said base in securing the front section of said cover closed.

13. A storage case for a disc-type media as set forth in claim 12 further including extended means on the front section of said cover which serves to aid in opening said storage case.

* * * * *